(12) United States Patent
Mitchell et al.

(10) Patent No.: US 10,997,877 B2
(45) Date of Patent: May 4, 2021

(54) LABEL FACESTOCK

(71) Applicant: UPM Raflatac Oy, Tampere (FI)

(72) Inventors: Noel Mitchell, Wuppertal (DE); Matti Manner, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 184 days.

(21) Appl. No.: 15/526,202

(22) PCT Filed: Nov. 18, 2014

(86) PCT No.: PCT/FI2014/050871
§ 371 (c)(1),
(2) Date: May 11, 2017

(87) PCT Pub. No.: WO2016/079367
PCT Pub. Date: May 26, 2016

(65) Prior Publication Data
US 2017/0323589 A1 Nov. 9, 2017

(51) Int. Cl.
| | | |
|---|---|---|
| *G09F 3/10* | (2006.01) | |
| *B32B 27/32* | (2006.01) | |
| *C09J 7/29* | (2018.01) | |
| *C09J 7/24* | (2018.01) | |
| *G09F 3/02* | (2006.01) | |

(52) U.S. Cl.
CPC ............... *G09F 3/10* (2013.01); *B32B 27/32* (2013.01); *C09J 7/243* (2018.01); *C09J 7/29* (2018.01);
(Continued)

(58) Field of Classification Search
CPC ......... B31D 1/021; B32B 27/18; B32B 27/08; B32B 27/32; B32B 27/327; B32B 2405/00; B32B 2519/00; B32B 7/12; G09F 3/02; G09F 3/10; G09F 2003/023; G09F 2003/0241; G09F 2003/0257;
(Continued)

(56) References Cited

U.S. PATENT DOCUMENTS 8,026,305 B2 * 9/2011 McLeod .............. C08K 5/0083
524/388
2004/0115457 A1 * 6/2004 Kong ........................ B32B 7/06
428/515

(Continued)

FOREIGN PATENT DOCUMENTS

| WO | 2008011402 A1 | 1/2008 |
| WO | 2014013132 A1 | 1/2014 |

OTHER PUBLICATIONS

Written Opinion of the International Searching Authority for International Application No. PCT/FI2014/050871, International Filing Date: Nov. 18, 2014.

(Continued)

*Primary Examiner* — Scott R. Walshon
(74) *Attorney, Agent, or Firm* — Cantor Colburn LLP

(57) ABSTRACT

A facestock for an adhesive label, an adhesive label and an adhesive label laminate including an uniaxially in machine direction oriented facestock is disclosed. According to an embodiment a core layer includes the following components: propylene homopolymer; a modifier consisting of at least one of the following: olefin elastomer, olefin plastomer and olefin block copolymer; and low density polyethylene. Further the use of the adhesive label for labelling of an article is also disclosed.

10 Claims, 2 Drawing Sheets

(52) U.S. Cl.
CPC ....... *B32B 2270/00* (2013.01); *B32B 2274/00* (2013.01); *B32B 2307/4023* (2013.01); *B32B 2307/516* (2013.01); *B32B 2307/75* (2013.01); *B32B 2405/00* (2013.01); *B32B 2519/00* (2013.01); *C09J 2203/334* (2013.01); *C09J 2423/006* (2013.01); *C09J 2423/046* (2013.01); *C09J 2423/106* (2013.01); *G09F 2003/0241* (2013.01); *G09F 2003/0273* (2013.01)

(58) Field of Classification Search
CPC ..... G09F 2003/0272; G09F 2003/0273; G09F 2003/0275; G09F 2003/0276; C09J 2203/334; C09J 2423/006; C09J 2423/106; C09J 2423/046; C08L 23/10; C08L 23/12; C08L 23/0815
See application file for complete search history.

(56) References Cited

U.S. PATENT DOCUMENTS

| | | | |
|---|---|---|---|
| 2004/0224175 A1* | 11/2004 | Henderson | C08L 23/10 428/515 |
| 2008/0199647 A1* | 8/2008 | Blackwell | B32B 27/32 428/41.8 |
| 2009/0017297 A1* | 1/2009 | Amon | B29C 43/24 428/349 |
| 2010/0260989 A1* | 10/2010 | Grefenstein | B32B 27/32 428/213 |
| 2011/0311792 A1* | 12/2011 | Batra | B32B 27/08 428/213 |
| 2012/0018098 A1* | 1/2012 | Henderson | B32B 27/304 156/703 |
| 2012/0060997 A1* | 3/2012 | Mitchell | B32B 27/08 156/60 |
| 2014/0134430 A1 | 5/2014 | Mitchell et al. | |

OTHER PUBLICATIONS

International Search Report of the International Searching Authority for International Application No. PCT/FI2014/050871, International Filing Date: Nov. 18, 2014, Date of Completion: Jul. 8, 2015, dated Jul. 16, 2015.

Anonymous, "Chapter One: Introduction to Ziegler-Natta Polymerization"; Jan. 27, 2010; retrieved from the Internet, URL: https://pdfs.semanticscholar.org/8d00/38cf0b4725ceca9e24e62daca08a7e580524.pdf; Retrieved on Sep. 6, 2019; 37 pages.

* cited by examiner

LABEL FACESTOCK

CROSS REFERENCE TO RELATED APPLICATIONS

This application is a National Stage application of PCT/FI2014/050871, filed Nov. 18, 2014, the content of which is incorporated herein in its entirety.

FIELD OF THE APPLICATION

The present invention relates to adhesive labels. More particularly, the invention relates to a machine direction oriented face film of the adhesive label.

BACKGROUND

It is general practice to apply a label to a surface of an article, such as bottle made of polymer or glass, to provide decoration, identification and/or information for example on the contents of the article, a trade name or logo.

SUMMARY

It is an aim of the embodiments to provide a facestock for adhesive label, an adhesive label and an adhesive label laminate comprising a facestock.

According to an embodiment an adhesive label is provided. The adhesive label comprises an uniaxially oriented multilayer facestock, wherein the facestock is uniaxially oriented in machine direction. The facestock comprises a core layer, a printable skin layer adjoined to the core layer, and an adhesive receiving skin layer adjoined to the core layer opposite the printable skin layer. The core layer of the facestock comprises the following components: propylene homopolymer; a modifier consisting of at least one of the following: olefin elastomer, olefin plastomer and olefin block copolymer; and low density polyethylene.

According to an embodiment, a use of an adhesive label is provided. The adhesive label comprising an uniaxially in machine direction oriented multilayer facestock, wherein a core layer of the facestock comprising the following components: propylene homopolymer; a modifier consisting of at least one of the following: olefin elastomer, olefin plastomer and olefin block copolymer; and low density polyethylene is used for labelling of an article.

According to an embodiment, a combination of an article and an adhesive label is provided. The adhesive label labelled onto the surface of the article through an adhesive layer comprises an uniaxially in machine direction oriented multilayer facestock, wherein a core layer of the facestock is comprising the following components: propylene homopolymer; a modifier consisting of at least one of the following: olefin elastomer, olefin plastomer and olefin block copolymer; and low density polyethylene.

According to an embodiment, an adhesive label laminate is provided. The adhesive label laminate includes an adhesive label comprising an uniaxially in machine direction oriented multilayer facestock, wherein a core layer of the facestock comprises the following components: propylene homopolymer; a modifier consisting of at least one of the following: olefin elastomer, olefin plastomer and olefin block copolymer; and low density polyethylene. The adhesive label laminate further comprises a pressure sensitive adhesive layer adjacent to an adhesive skin layer of the facestock, and a release liner.

Further embodiments of the application are presented in dependent claims.

According to an example, the modifier is at least one of the following: ethylene-butene elastomer, ethylene-octene elastomer, propylene based elastomer, butene-1 homopolymer, propylene-ethylene plastomer, propylene-butene plastomer, and ethylene-octene block copolymer.

According to an example, the modifier is at least one of the following: ethylene-butene elastomer, ethylene-octene elastomer, and ethylene-octene block copolymer.

According to an example, total amount the modifier is between 5 and 20 wt. %.

According to an example, an amount of propylene homopolymer is between 40 and 87 wt. %.

According to an example, an amount of low density polyethylene is between 1 and 10 wt. %.

According to an example, the core layer further comprises one of the following additives: polypropylene compound comprising Bis(4-propylbenzylidene) propyl sorbitol, polypropylene compound comprising phosphate type nucleating agent, and propylene-ethylene block copolymer.

According to an example, an amount of the additive is between 2 and 10 wt. %.

According to an example, the printable skin layer comprises total amount of between 40 and 70 wt. % of propylene homopolymer(s) and between 25 and 60 wt. % of Ziegler-Natta catalysed linear low density polyethylene comprising density between 0.930 and 0.940 g/cm$^3$, when measured according to standard ASTM D 792.

According to an example, the printable skin layer comprises total amount of between 90 and 99 wt. % of linear low density polyethylene(s).

According to an example, the printable skin layer comprises between 45 and 70 wt. % of metallocene catalysed linear low density polyethylene comprising density between 0.930 and 0.950 g/cm$^3$, when measured according to standard ISO 1183, and wherein the printable skin layer further comprises between 30 and 50 wt. % of Ziegler-Natta catalysed linear low density polyethylene comprising density between 0.930 and 0.940 g/cm$^3$, when measured according to standard ASTM D 792.

According to an example, the printable skin layer comprises between 40 and 70 wt. % of propylene homopolymer(s) and between 25 and 60 wt. % of metallocene catalysed linear low density polyethylene comprising density between 0.930 and 0.950 g/cm$^3$, when measured according to standard ISO 1183.

According to an example, the adhesive receiving skin layer comprises propylene homopolymer; linear low density polyethylene; a modifier consisting of at least one of the following: olefin elastomer, olefin plastomer and olefin block copolymer; and low density polyethylene.

According to an example, the facestock layer is uniaxially oriented in machine direction having stretch ratio between 3 and 9.

According to an example, the adhesive label further comprises a pressure sensitive adhesive layer adjacent to the adhesive skin layer.

DESCRIPTION OF THE DRAWINGS

In the following examples, the embodiments of the invention will be described in more detail with reference to appended drawings, in which.

DETAILED DESCRIPTION

In this description and claims, the percentage values relating to an amount of a material are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

| | |
|---|---|
| $S_x$, $S_y$, $S_z$ | 3D coordinates, |
| TD | transverse direction, |
| CD | cross direction, |
| MD | machine direction, |
| MRK1 | graphics (printing), |
| DSC | differential scanning calorimeter, |
| GPC | gel permeation chromatography, |
| $M_n$ | number average molecular weight, |
| $M_w$ | weight average molecular weight, |

1 a label laminate,
2 a release liner,
4 a face stock,
5 an adhesive layer,
7 a label,
8 a core layer,
9 a first skin layer,
10 a second skin layer,
100 an article
20 a labelled article.

A label is a piece of material carrying information and to be applied onto articles of different shapes and materials. An article may be a package, such as a bottle. A label comprises at least a face layer also referred to as a face stock layer. Usually the label comprises also an adhesive layer. A label comprising pressure sensitive adhesive may be referred to as a pressure sensitive adhesive (PSA) label. Pressure sensitive adhesive labels may also be referred to as self-adhesive labels.

Labels may be used in wide variety of labelling applications and end-use areas, such as labelling of food, home and personal care products, industrial products, pharmaceutical and health care products, beverage and wine bottles, tyres etc. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terphtalate (PET) bottles, and bottles made of polyolefin, such as high density polyethylene (HDPE) and polypropylene (PP). The label may surround the labelled article, such as a bottle, completely or partially.

Term "face layer" 4 refers to a top layer of the label, also called as a facestock, or a face material layer. The face layer 4 is the layer that is adhered to the surface of an article during labelling through an adhesive layer 5. The face layer may comprise e.g. printing in order to provide information and/or visual effect, such as information of the content of the item labelled.

Figure 1:
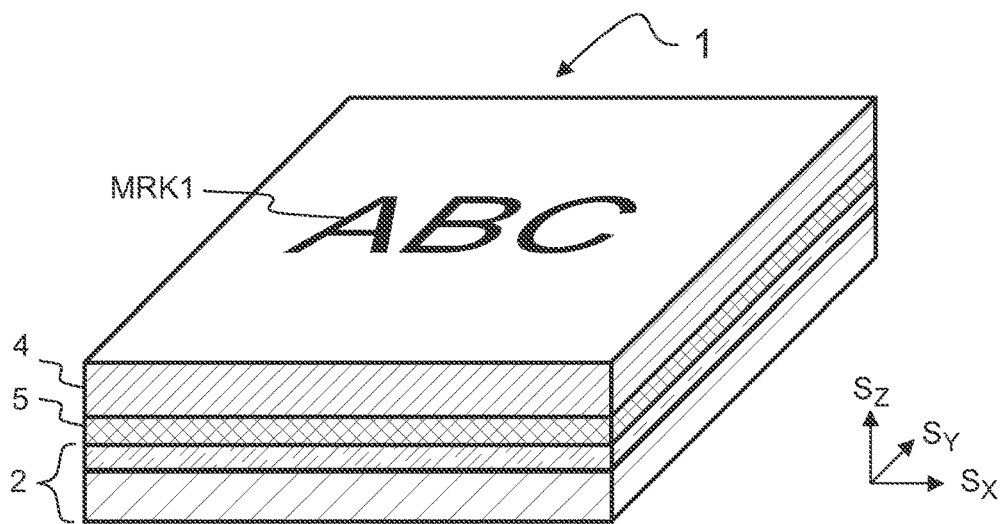
FIG. 1 shows, in a 3D view, an example embodiment of a label laminate comprising printing.

Graphical patterns may be performed by printing to the face stock prior to lamination of the label laminate structure. Alternatively, the face stock of a laminated structure 1 is printed. A label laminate structure or a label consisting of printed face stock layer may be referred to as a printed laminate or printed label. With reference to FIG. 1, the printing layer MRK1 may be on top of the face layer 4. A protective layer(s) (overlaminate layer(s)), such as lacquer, may be on top of the printing layer. Alternatively, the face stock may be reverse printed i.e. the surface of the face stock adjacent to the adhesive layer comprises printing.

Printable face layer is suitable for printing by any of the known printing methods, such as with gravure, flexographic process, offset, screen or letterpress. The printing may exist on a top surface, reverse side or both top and reverse side of the face layer. The face layer may have a monolayer or multilayer film structure comprising at least two layers. The multilayer structure may be co-extruded or it may comprise several layers laminated together.

Term "printable surface" refers to a surface, such as a surface of a face layer, that is suitable for printing. Printable surface is also able to maintain the printing, such as printed text and/or graphics. Printable surface has sufficiently high surface energy. A low surface energy may lead to poor retaining capability of printing ink applied to the surface. According to an embodiment a printable label structure comprises at least one printable surface of a face stock.

Term "release liner" 2 refers to a structure comprising or consisting of a substrate and a release layer on the surface of the substrate contacting the adhesive layer 5 in a label laminate. A release layer may comprise or consist of a release agent. A release agent is a chemical having low surface tension and it is used to prevent other materials from bonding to it and to provide a release effect. Release liners of the label laminates serve one or more useful functions: they are used as a carrier sheet onto which the adhesive may be coated; they protect the adhesive layer during storage and transportation; they provide a support for labels during die-cutting and printing, and ultimately they release from the adhesive leaving it undamaged.

In this application term "label laminate" 1 refers to a product comprising a face stock 4, adhesive layer 5, and a release liner 2. In the label laminate face stock 4 is laminated together with a release liner 2 having an adhesive layer 5 in between, as shown in FIG. 1. The label laminate may be a continuous structure from which the individual labels may be die-cut. In a FIG. 2, a label laminate comprising four cut labels 7 in a common release liner 2 is presented. The release liner of the label laminate is removed prior to labelling i.e. attaching the label onto the surface of an item to be labelled.

Figure 2:
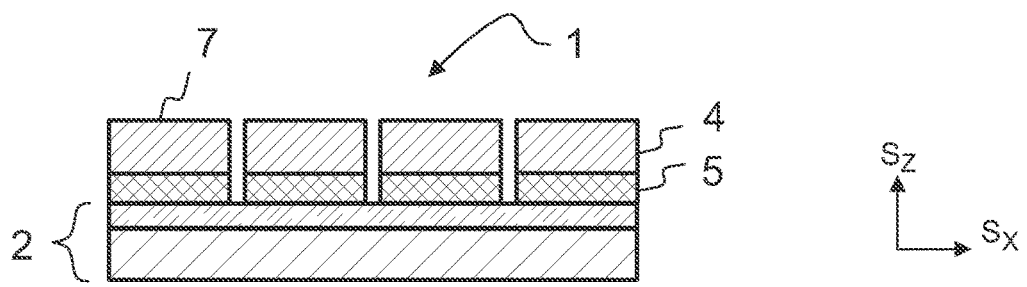
FIG. 2 shows, in a cross sectional view, a label laminate comprising cut labels attached to a common release liner.
Figure 3:
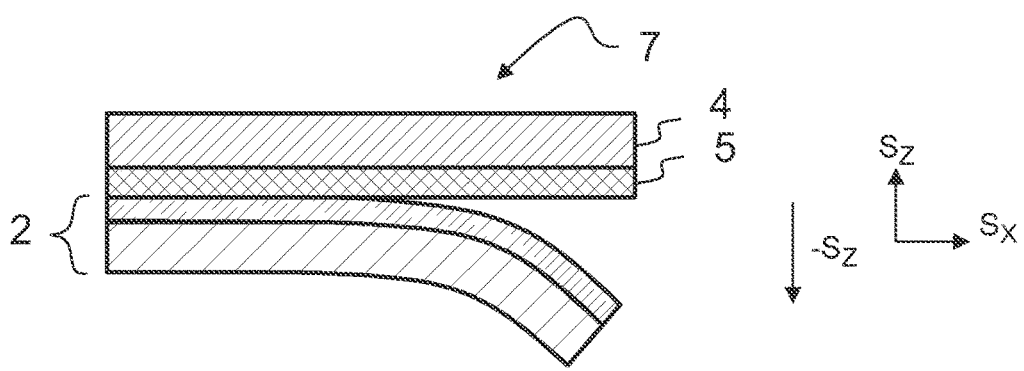
FIG. 3 shows, in a cross sectional view, separating label from release liner.

Referring to FIG. 2, individual labels 7 may be cut from the label laminate structure 1. In particular, the labels 7 may be die-cut from the label laminate structure 1. After the cutting, the labels may be attached to a common liner 2 (the liner remains uncut). Thus, a plurality of labels may remain attached to a common continuous liner 2. Alternatively, the labels 7 may be completely separate (i.e. also the liner 2 may be cut). Referring to FIG. 3, a label 7, including a face stock 4 and an adhesive layer 5, may be separated from the release liner 2 e.g. by pulling the liner 2 in the direction $-S_z$ with respect to the label 7. Thus, a surface of the adhesive layer 5 is exposed so that said surface can be attached to an article to be labelled.

Figure 5:
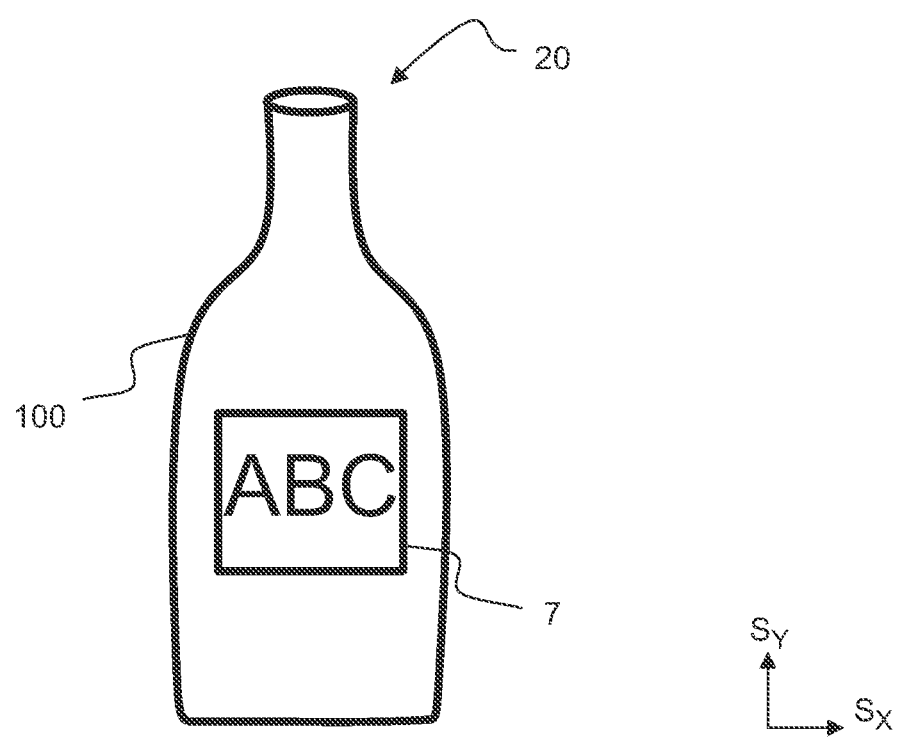
FIG. 5 shows a labelled article.

Referring to FIG. 5. the label 7 can be affixed to the substrate, i.e. to the surface of an article 20 through the adhesive layer 5. The adhesive layer may consist of a pressure sensitive adhesive (PSA). The labels consisting of PSA can be adhered to most surfaces through an adhesive layer without the use of a secondary agent, such as a solvent, or heat to strengthen the bond. The PSA forms a bond when pressure is applied onto the label at room temperature, adhering the label to the product to be labelled. Examples of pressure sensitive adhesives include emulsion and water based PSAs, solvent based PSAs and solid PSAs. Alternatively, a label may be a linerless label comprising a facestock and a layer of activatable adhesive.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. The PSA layer may have a thickness in the range of about 5-40 μm, for example in the range of about 8-20 μm. The amount of the adhesive layer may be 10-20 g/m², or preferably less than 15 g/m²; or more preferably less than 10 g/m².

Term "conformability" refers to the capability of the label to conform smoothly to the contour of the article even when this is curved in two dimensions.

Term "dualistic asymmetric" or "double asymmetric" refers to a multilayer facestock having both different layer thickness and composition of separate layers.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer of a label refers to a configuration, where the topmost layer forms upper part of the label structure arranged opposite to an adhesive layer (undermost layer) attaching the label structure onto the surface of an item.

Molecular weight determination of the polymers, such as linear low density polyethylene, can be provided by using gel permeation chromatography (GPC) in order to provide $M_n$ and $M_w$ values referred to in the description.

Narrow molecular weight polystyrene standards and appropriate Mark-Houwink coefficients are used for determination.

A polymer modifier refers to polymeric flexibilizing agents. Polymer modifiers include, for example, olefin elastomer(s), olefin plastomer(s), and olefin block copolymer(s).

Olefin elastomer refers to polymer modifiers. For example, ethylene elastomers, such as random copolymers of ethylene-butene, also referred to as random copolymers of butene-1 with low, medium, or high ethylene content, and random copolymers of ethylene-octene. Olefin elastomers may also comprise butene-1 homopolymers and propylene elastomers, such as propylene-ethylene copolymers. Ethylene elastomers may be provided by metallocene catalyst also referred to as single-site catalyst or constrained geometry catalyst. The metallocene catalyst selectively polymerizing the ethylene and co-monomer sequences, such as butene or octene and increasing co-monomer content will produce polymers with higher elasticity, referred to olefin elastomers, as the co-monomer incorporation disrupts the polyethylene crystallinity. Olefin elastomers may have effect on flexibility of the polymer film. Olefin elastomers may also have effect on clarity of the polymer film.

Olefin block copolymer as a polymer modifier refers to ethylene-octene block copolymers provided by chain-shuttling polymerization (dual catalyst system) resulting olefin block copolymers with alternating semicrystalline and amorphous segments. Semicrystalline segments consists of ethylene-octene blocks (hard segments, highly rigid) with very low co-monomer content and high melting temperature. Amorphous segments consists of ethylene-octene blocks (soft segments, highly elastomeric) with high co-monomer content and low glass transition temperature. The olefin block copolymers, such as ethylene-octene block copolymers, exhibit characteristics of elastomers. Olefin block copolymers may be characterized by broader molecular weight distribution (MWD) compared to traditional anionic block copolymers made via living polymerization.

Olefin plastomer refers to polymer modifiers, such as propylene plastomers e.g. propylene-ethylene plastomer and propylene-butene plastomer. Propylene-ethylene plastomers may be provided by single-site metallocene catalyst and have molecular structure different from the typical Ziegler-Natta and metallocene catalyst based copolymers of propylene. Olefin plastomers may have narrow molecular weight distribution and broad crystallinity distribution. Molecular weight distribution ($M_w/M_n$) may be between 2 and 3. According to an example, low-percentage of crystalline phase may be homogeneously dispersed in the butene-1 polymer. Olefin plastomers may have effect on elasticity of the polymer film. Olefin plastomers may also have effect on clarity. They may further have effect on providing good adhesion to other polyolefins.

Linear low density polyethylene LLDPE refers to random copolymer of ethylene and longer chain alpha-olefins, such as butene, hexene or octene, provided by using either Ziegler-Natta catalyst or metallocene catalyst. Density of LLDPE(s) may be at least 0.92 g/cm³, for example, between 0.930 and 0.950 g/cm³. Ziegler-Natta catalyst results a semicrystalline linear polymer with a plurality of molecular weights and copolymer molecules with variety of compositions. Metallocene catalyst provides narrower molecular weight distribution. Controlled co-monomer distribution and short-chain branching distribution can also be provided. Efficient use of co-monomer has effect on providing certain density with lower amounts of co-monomers when compared to Z—N catalysed polymer. Lower amount of co-monomer has effect on toughness of the polymer. Due to the smaller crystal size and narrower distribution of the crystal sizes metallocene LLDPE further exhibits a sharp, but low melting temperature.

Low density polyethylene LDPE refers to a branched ethylene homopolymer comprising a density range 0.91-0.94 g/cm³, when measured according to standard ISO 1183.

Term "machine direction" MD refers to the running direction Sx of the face layer or continuous label laminate during label manufacturing. "Transverse direction" TD or "cross direction" CD refers to the direction Sy perpendicular to the running direction Sx of the face layer or label laminate.

Stretch ratio refers to the ratio of total film thickness before and after stretching. In other words, stretch ratio is the ratio of non-oriented (undrawn) film thickness to the oriented (stretched) film thickness. The non-oriented thickness is the thickness after extrusion and subsequent chilling of the film, such as a face stock. During stretching, the thickness diminishes in the same ratio as the film is stretched or elongated. For example, a face stock having thickness of 100 micrometres before machine direction orientation (MDO) is stretched by a stretch ratio of 5. After the machine direction orientation the face stock has a fivefold diminished thickness of 20 micrometres.

During stretching the randomly oriented polymer chains of the extruded plastic faces stock are oriented in the direction of stretching (drawing). Orientation under uniaxial stress provides orientation of polymer chains in the direction of stress provided. In other words, the polymer chains are oriented at least partially in the direction of stretching (drawing). Thus, the oriented face stock comprises or consists of polymer chains having specific orientation degree in the direction of stretching. The degree of orientation of the polymer chains depends on amount of stretching. Thus, the polymer chains in the faces stock having higher orientation degree are more oriented when compared to the faces stock having lower orientation degree.

Structure of a Facestock

A face stock layer 4 may have a multilayer plastic film structure including two or more plastic film layers. Multilayer structure has effect on providing more optimized face stock properties. The multilayer face stock, also referred to a multilayer film, may comprise a core layer and at least one skin layer. Preferably, the face stock has a skin layer on both surfaces of the core layer, i.e. the face stock has a three layer structure.

Figure 4:
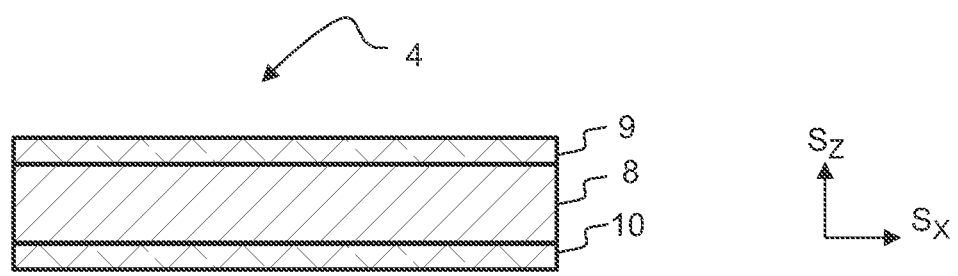
FIG. 4 shows, in a cross sectional view, a multilayer facestock.

According to an embodiment, a multilayer face stock has a three layer structure. With reference to FIG. 4, a three layer structure includes a core layer 8 having a first surface and a second surface. A first skin layer 9 is provided on the first surface of the core layer 8. A second skin layer 10 is provided on the second surface of the core layer 8.

At least one layer of the multilayer structure is suitable for printing. For example, the print receiving skin layer may have a surface energy at least 36 dynes/cm, preferably at least 38 dynes/cm or at least 44 dynes/cm measured according to the standard ASTM D-2578. The surface energy may be between 36 and 60 dynes/cm, preferably between 38 and 56 dynes/cm or between 44 and 50 dynes/cm. The surface energy level may also be maintained higher than or equal to 38 dynes/cm after 50 or 120 days. Surface energy expressed in units of dynes/cm meaning force/unit length may also be expressed in units of mN/m.

According to an example a first skin layer 9 of a face stock is printable and referred to as a print receiving layer. Printable skin layer may be surface treated prior to printing. Surface treatment may comprise e.g. corona, plasma or flame treatment. An adhesive layer may be applied onto the second skin layer 10, which may be thus referred to as an adhesive receiving layer.

In a two layer structure comprising a core layer and a first skin layer an adhesive layer may be applied directly onto the second surface of the core layer opposite to first skin layer. There may also be additional skin layers or other layers, such as barrier and/or tie layers, in order to improve the label features, such as label functionality, mechanical properties, or the visual appearance. A tie layer may be used in order to provide enhanced adhesion between the core and skin layer(s) and prevent peeling (delamination) of the multilayer structure. Barrier layer(s) may be used in order to prevent, for example, migration of unwanted ingredients. An overvanish or lacquer layer may be used on top of the print layer to protect the printing layer. Film surfaces may also be treated prior to printing, for example by flame treatment, corona treatment or plasma treatment in order to enhance for example adhesion. Treated surfaces may also be top coated.

In a multilayer structure, thicknesses of separate layers may be different. Preferably, the core layer may be relatively thick compared to skin layer(s). In other words, the thickness of the core layer may be greater than the thickness of the first skin layer and/or the second skin layer. The thickness for the three layered film (1st skin %:core %:2nd skin %=total 100%), as shown in FIG. 4, may be 5:85:10, 5:90:5, or 10:80:10. The thickness of the second skin layer is 2 to 30% of the total thickness of the face stock. For example, the thickness of the core layer may be between 60 and 90%, or between 70 and 90%, preferably between 75 and 90% or between 80 and 90% of the total thickness of the face stock layer. The thickness of the first skin layer may be at least 2% or at least 5%, between 2 and 10% or between 5 and 10% of the total thickness of the face stock. The thickness of the second skin layer may be at least 2% or at least 5%, between 2 and 30% or between 5 and 10% of the total thickness of the face stock layer.

A thin first skin layer may have effect on the haze of the face stock film. A thick core layer together with a thin first skin layer may have effect on providing adequate mechanical properties for the face stock, e.g. adequate stiffness. Individual layers having thicknesses different from each other have effect on providing asymmetric face stock structure.

According to an embodiment, a three layer face stock has asymmetric structure with respect to at least one of the following: thickness and composition of the skin layers. Three layer face stock having both different skin layer thicknesses and compositions may be referred to as a double asymmetric faces stock.

An asymmetric structure comprising different layer thicknesses and/or compositions may have effect on providing more optimized properties for the plastic film, for example high enough stiffness, good printability, adhesive anchorage, and optimized die-cutting properties. At least some/all embodiments have effect on effective die-cutting of the labels. A multilayer face material may have effect on optimized bursting of the face compressed by the tool's cutting edge during die-cutting. At least some/all embodiments have effect on providing undamaged silicone layer and the backing material (release liner) during cutting. For example, a face stock construction 5:85:10 has effect on providing optimized properties for label converting steps and subsequent labelling.

A symmetric structure whit respect to the thickness of the skin layers, such as 5:90:5 or 10:80:10, may have effect on providing easier manufacturing. A symmetric structure may further have effect on reducing the curling tendency of the film. Symmetric structure may provide e.g. good overall flatness of the face stock. Good overall flatness refers to absence of e.g. creases, wrinkles or wavy edges.

Preferably, a face stock has the total thickness smaller than 100 microns or smaller than 80 microns, preferably smaller than 75 microns or 60 microns. The face stock layer may have a total thickness between 30 and 80 microns, or between 40 and 60 microns, for example 50 microns.

According to an embodiment a face stock is oriented in one direction i.e. the face stock is uniaxially oriented. Uniaxial orientation, also referred to as monoaxial orientation (MO), refers to the stretching (drawing) provided only in one direction. A face stock may be uniaxially oriented in machine direction (MD), i.e. in the direction of the longitudinal movement of the continuous faces stock. Referring to FIGS. 1-6, the direction $S_x$ corresponds to the machine direction (MD) of the substrate. With reference to FIG. 5, the direction $S_y$ corresponds to the transverse direction (TD) of the substrate. TD is also referred to as a cross direction (CD) of the substrate.

According to an embodiment, a face stock is uniaxially stretched in the machine direction i.e. in the direction of the movement of the face stock (longitudinal direction of the continuous film) by a machine direction orientation process. Stretch ratio of the face stock may be at least 3 or at least 4, for example 7.5. Maximum for the stretch ratio is 9. Stretch ratio may be between 3 and 9, preferably between 5 and 7.5. A Stretch ratio together with the composition of the face stock provides properties suitable for label converting and subsequent application.

Monoaxial orientation of the face stock in machine direction may have effect on the modulus and stiffness of the face stock in the machine direction. For example, with increasing orientation degree in machine direction the modulus and stiffness of the face stock increases in said direction (MD). Further, orientation reduces the elongation of the face stock in said orientation direction. Monoaxial orientation may also have effect on maintaining low modulus, flexibility and conformability of the film in the transverse direction (cross-direction).

According to an embodiment, the machine direction oriented face stock is annealed (heat-set) after stretching. Annealing may enhance dimensional stability of the face stock. Annealed face stock is non-shrinkable at subsequent operation temperatures. The oriented face stock is dimensionally stable e.g. during following label laminate converting steps and during labelling. For example, the oriented face stock has a shrinkage less than 5%, preferably less than 2%, or more preferably less than 1% at temperatures below 30 degrees C. Pressure sensitive adhesive labels may comprise annealed face stock.

According to an embodiment, the machine direction oriented face stock may be non-annealed after stretching. In other words, the oriented substrate is cooled after stretching without an annealing step between the stretching and cooling. Non-annealed face stock may have effect on shrinking capability providing higher shrinkage e.g. over 10%.

Compositions of the Facestock Layers
Core Layer

According to an embodiment, a core layer comprises at least the following components: propylene homopolymer; a modifier comprising at least one of the following: olefin elastomer, olefin plastomer and olefin block copolymer, such as ethylene-octene block copolymer; and low density polyethylene. The core layer may further comprise additives, such as antioxidant, crystallization nucleator(s) and another olefin block copolymer, such as propylene-ethylene block copolymer.

Propylene Homopolymer

One of the polymer components in the core layer is propylene homopolymer. An amount of propylene homopolymer may be between 40 and 87 wt. %, between 75 and 87 wt. %, or between 78 and 85 wt. %.

The propylene homopolymer may have melt flow rate (MFR) between 2 and 9.5, between 2 and 7.5, or preferably between 2 and 4 g/10 min, when measured at 230° C./2.16 kg according to standard ISO 1133. Density may be 0.900 g/cm$^3$, when measured according to standard ISO 1183. Vicat softening temperature may be between 152 and 155 degrees C. (A50 (50° C./h 10N)), when measured according to standard ISO 306 standard. The propylene homopolymer having MFR between 2 and 9.5 g/10 min may have effect on stiffness of the film manufactured.

In an example, the propylene homopolymer has melt flow rate (MFR) 2 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer has melt flow rate (MFR) 7.5 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer has melt flow rate (MFR) 9.5 g/10 min, when measured at 230° C./2.16 kg according to standard ISO 1133. Density may be 0.900 g/cm$^3$, when measured according to standard ISO 1183. Vicat softening temperature may be 153 degrees C. (A50 (50° C./h 10N)), when measured according to ISO 306 standard.

In an example, the propylene homopolymer has melt flow rate (MFR) 2 g/10 min, when measured at 230° C./2.16 kg according to standard ISO 1133. Density may be 0.900 g/cm$^3$, when measured according to standard ISO 1183. Vicat softening temperature may be 155 degrees C. (A50 (50° C./h 10N)), when measured according to ISO 306 standard.

In an example, the propylene homopolymer has melt flow rate (MFR) 3 g/10 min, when measured at 230° C./2.16 kg according to standard ISO 1133. Density may be 0.900 g/cm$^3$, when measured according to standard ISO 1183. Vicat softening temperature may be 154 degrees C. (A50 (50° C./h 10N)), when measured according to ISO 306 standard.

Low Density Polyethylene

The core layer further comprises low density polyethylene (LDPE). An amount of low density polyethylene (LDPE) may between 1 and 10 wt. %, or between 3 and 7 wt. %

LDPE may have melt flow rate (MFR) between 0.2 and 10, between 0.5 and 8, or preferably between 0.7 and 4 g/10 min, when measured at 190° C./2.16 kg using method according to standard ISO 1133. Density may be between 0.919 and 0.934, or between 0.920 and 0.928 g/cm$^3$, when measured using test method according to standard ISO 1183. Vicat softening temperature may be between 88 and 111, or between 95 and 105° C. A50 (50° C./h 10N), when measured using test method according to standard ISO 306.

Low density polyethylene having melt flow rate between 0.7 and 4 g/10 min, density between 0.920 and 0.928 g/cm$^3$, and Vicat softening point between 95 and 105° C. may have effect on providing enhanced converting properties for labels.

In an example, the LDPE has melt flow rate (MFR) 0.25 g/10 min when measured at 190° C./2.16 kg according to ISO 1133 standard. Vicat softening temperature (A50) may be 96° C. according to standard ISO 306. Density may be 0.923 g/cm$^3$, when measured using test method ISO 1183.

In an example, the LDPE has melt flow rate (MFR) 0.75 g/10 min when measured at 190° C./2.16 kg according to ISO 1133 standard. Vicat softening temperature (A50) may be 96° C. according to standard ISO 306. Density may be 0.923 g/cm$^3$, when measured using test method ISO 1183.

In an example, the LDPE has melt flow rate (MFR) 0.95 g/10 min when measured at 190° C./2.16 kg according to ISO 1133 standard. Vicat softening temperature (A50) may be 100° C. according to standard ISO 306. Density may be 0.927 g/cm³, when measured using test method ISO 1183.

In an example, the LDPE has melt flow rate (MFR) 1.9 g/10 min when measured at 190° C./2.16 kg according to ISO 1133 standard. Vicat softening temperature (A50) may be 90° C. according to standard ISO 306. Density may be 0.924 g/cm³, when measured using test method ISO 1183.

In an example, LDPE has melt flow rate (MFR) 1.9 g/10 min when measured at 190° C./2.16 kg using method ISO 1133. Density may be 0.926 g/cm³ using test method ISO 1183(A). Vicat softening temperature may be 99° C. at 10 N (VST/A) using test method ISO 306.

In an example, the LDPE has melt flow rate (MFR) 3 g/10 min when measured at 190° C./2.16 kg according to ISO 1133 standard. Vicat softening temperature (A50) may be 109° C. according to standard ISO 306. Density may be 0.934 g/cm³, when measured using test method ISO 1183.

In an example, the LDPE has melt flow rate (MFR) 4 g/10 min when measured at 190° C./2.16 kg according to ISO 1133 standard. Vicat softening temperature (A50) may be 92° C. according to standard ISO 306. Density may be 0.924 g/cm³, when measured using test method ISO 1183.

Modifier

The core layer further comprises a modifier comprising at least one of the following: olefin elastomer, olefin plastomer and olefin block copolymer. Total amount of the modifier may be between 2 and 30 wt. %, preferably between 5 and 20 wt. %, or between 10 and 15 wt. %.

Olefin elastomer as a modifier may be at least one of the following random copolymer of ethylene-butene, also referred to as ethylene-butene elastomer, and random copolymer of ethylene-octene, also referred to as ethylene-octene elastomer. Random copolymer of ethylene-butene may comprise butene-1 with low, medium, or high ethylene content. Olefin elastomer may also comprise propylene based elastomers, such as propylene-ethylene copolymers, and/or butene-1 homopolymers. Butene-1 homopolymer may also be referred to as polybutene-1. Butene-1 is semi-crystalline homopolymer, which are compatible with polypropylene due its similar molecular structure.

Melt index of olefin elastomers, such as random copolymers comprising ethylene, at 190° C. may be between 0.5 and 30 g/10 min, preferably between 0.5 and 5, when measured according to standard ASTM D1238. Alternatively, melt flow rate at 190° C./2.16 kg may be between 2.5 and 4 g/10 min, when measured according to standard ISO 1133. Density may be between 0.857 and 0.915 g/cm³, when measured according to standard ASTM D792. Alternatively, density may be between 0.897 and 0.911 g/cm³, when measured according to standard ISO 1183. Glass transition temperature may be between −65 and −30° C. according to DSC measurements. Melting peak temperature may be between 34 and 120° C., according to DSC measurements using heating rate 10 degrees C./min. Total crystallinity may be between 10 and 15%.

Density of butene-1 homopolymer as an elastomer may be between 0.914 and 0.915 g/cm³ according to ISO 1183 standard. Melt flow rate may be between 0.4 and 200 g/10 min, preferably between 0.4 and 15, or between 0.4 and 4 g/10 min, when measured at 190° C./2.16 kg according to ISO 1133. Melting temperature may be between 114 and 124° C.

Density of propylene based elastomer may be between 0.863 and 0.868 g/cm³, when measured according to standard ASTM D792. Melt flow rate at 230° C./2.16 kg may be between 2 and 25 g/10 min, preferably between 2 and 8 g/10 min, when measured according to standard ASTM D1238. Glass transition temperature may be between −27 and −21° C. Melting peak temperature may be between 66 and 131° C. Total crystallinity may be between 11 and 14%.

Olefin plastomer as a modifier may be at least one of the following: propylene-ethylene plastomer and propylene-butene plastomer. Preferably, the olefin plastomer is propylene-butene plastomer. Olefin plastomers may have narrow molecular weight distribution and broad crystallinity distribution. Molecular weight distribution ($M_w/M_n$) may be between 2 and 3. Melt flow rate (MFR) may be between 0.5 and 25 g/10 min (190° C./2.16 kg), when measured according to standard ISO 1133. Alternatively, melt flow rate may be between 2 and 25 g/10 min, when measured according to standard ASTM D 1238 at 230° C./2.16 kg. Density may be between 0.859 and 0.890 g/cm³, when measured according to standard ASTM D 792. Co-monomer content may be between 5 and 15 wt. %. Glass transition temperature may be between −15 and −35 degrees C. Board crystallinity distribution resulting in broad melting behaviour and melting range being between 50 and 135 degrees C. Total crystallinity may be between 5 and 45%.

Olefin block copolymer as a modifier may be ethylene-octene block copolymer provided by chain-shuttling polymerization (dual catalyst system) resulting olefin block copolymers with alternating semicrystalline and amorphous segments. Density of the olefin block copolymer may be between 0.866 and 0.887 g/cm³, when measured according to standard ASTM D729. Olefin block copolymers may have sharp melting peaks. Melting temperature may be between 118 and 122° C. Melt index may be between 0.5 and 15 g/10 min, when measured at 2.16 kg/190° C. according to standard ASTM D1238. Glass transition temperature may be between −65 and −54° C. Ethylene-octene block copolymer used as a modifier may have effect on providing better die-cutting properties of the facestock.

In an example, the core layer includes a modifier comprising or consisting of ethylene-octene elastomer, which is random copolymer of ethylene and octene co-monomers. Ethylene-octene copolymers may be provided by single-site metallocene catalyst or by constrained geometry metallocene catalyst. Melt index of ethylene-octene elastomers at 190° C. may be between 0.5 and 30 g/10 min, or between 1 and 10 g/10 min, preferably between 3 and 7 g/10 min, when measured according to standard ASTM D1238. Density may be between 0.855 and 0.910 g/cm³, or between 0.863 and 0.900 g/cm³, preferably between 0.865 and 0.0880 g/cm³, when measured according to standard ASTM D792. Glass transition temperature may be between −61 and −30° C., or between −58 and −33° C., preferably between −58 and −50° C., when measured using DSC. Melting peak temperature may be between 36 and 105° C., or between 47 and 77° C., preferably between 55 and 65° C., when measured using DSC with heating rate 10 degrees C./min. Total crystallinity may be between 13 and 35%, or between 16 and 25%, preferably between 18 and 21%.

For example, ethylene-octene elastomer has MFR 5 g/10 min when measured at 190° C./2.16 kg according to ASTM D1238. Density may be 0.870 g/cm³ according to ASTM D792. Glass transition temperature may be −53° C. Melting temperature may be 59° C. Peak crystallization temperature may be 44° C. Total crystallinity may be 19%. Vicat softening temperature may be 37.0° C. according to ASTM D1525.

For example, ethylene-octene elastomer has MFR 0.5 g/10 min when measured at 190° C./2.16 kg according to ASTM D1238. Density may be 0.863 g/cm³ according to ASTM D792. Glass transition temperature may be −55° C. Melting peak temperature may be 47° C. Total crystallinity may be 16%.

For example, ethylene-octene elastomer has MFR 1 g/10 min when measured at 190° C./2.16 kg according to ASTM D1238. Density may be 0.870 g/cm$^3$ according to ASTM D792. Glass transition temperature may be −52° C. Melting peak temperature may be 60° C. Total crystallinity may be 18%.

For example, ethylene-octene elastomer has MFR 3 g/10 min when measured at 190° C./2.16 kg according to ASTM D1238. Density may be 0.875 g/cm$^3$ according to ASTM D792. Glass transition temperature may be −54° C. Melting peak temperature may be 65° C. Total crystallinity may be 20%.

For example, ethylene-octene elastomer has MFR 13 g/10 min when measured at 190° C./2.16 kg according to ASTM D1238. Density may be 0.864 g/cm$^3$ according to ASTM D792. Glass transition temperature may be −55° C. Melting peak temperature may be 56° C. Total crystallinity may be 13%.

For example, ethylene-octene elastomer has MFR 3 g/10 min when measured at 190° C./2.16 kg according to ASTM D1238. Density may be 0.902 g/cm$^3$ according to ASTM D792. Glass transition temperature may be −32° C. Melting peak temperature may be 97° C. Total crystallinity may be 29%.

An amount of ethylene-octene elastomer may be between 2 and 30 wt. %, preferably between 5 and 20 wt. %, or between 10 and 15 wt. %. Ethylene-octene elastomer may have effect on flexibility of the facestock. It may also increase the internal haze of the facestock.

In an example, the core layer includes a modifier comprising or consisting of ethylene-butene elastomer(s). Ethylene-butene elastomers are random copolymers of ethylene and butene. Ethylene-butene elastomers may have density in range of 0.897-0.911 g/cm$^3$ (ISO 1183). Alternatively, density may be between 0.862 and 0.891 g/cm$^3$, when measured according to standard ASTM D 729. Melt index may be between 0.5 and 5 g/10 min, when measured according to standard ASTM D1238 at 190° C./2.16 kg. Alternatively, melt flow rate (MFR) may be between 0.5 and 40 g/10 min, preferably between 0.5 and 4 g/10 min, or between 2.5 and 4 g/10 min (190° C./2.16 kg, ISO 1133). Melting peak temperature may be between 34 and 120° C., when measured using DSC with heating rate 10 degrees C./min. Alternatively melting temperature may be in range of 81-97° C., corresponding to melting point of crystalline form 2 measured after solidification. Glass transition temperature may be between −65 and −40° C., when measured using DSC. Total crystallinity may be between 12 and 28%.

In an example, ethylene-butene elastomer is random copolymer of butene-1 with medium ethylene content comprising density of 0.901 g/cm$^3$, when measured according to standard ISO 1183. Melt flow rate may be 2.5 g/10 min, when measured at 190° C./2.16 kg according to standard ISO 1133. Melting temperature may be 85° C., corresponding with melting point of crystalline form 2 measured after solidification.

In an example, ethylene-butene elastomer is a random copolymer of butene-1 with high ethylene content having density of 0.897 g/cm$^3$ according to ISO 1183 standard. Melt flow rate may be 3.5 g/10 min, when measured at 190° C./2.16 kg according to ISO 1133. Melting temperature may be 81° C.

In an example, ethylene-butene elastomer is a random copolymer of butene-1 with low ethylene content. It may have density of 0.911 g/cm$^3$ according to ISO 1183 standard. Melt flow rate may be 4 g/10 min, when measured at 190° C./2.16 kg according to ISO 1133. Melting temperature may be 97° C.

In an example, ethylene-butene elastomer is a random copolymer of butene-1 with low ethylene content. It may have density of 0.913 g/cm$^3$ according to ISO 1183 standard. Melt flow rate may be 1 g/10 min, when measured at 190° C./2.16 kg according to ISO 1133. Melting temperature may be 97° C.

In an example, ethylene-butene has density of 0.880 g/cm$^3$ according to ASTM D792 standard. Melt index may be 0.8 g/10 min, when measured at 190° C./2.16 kg according to ASTM D1238. Melting peak may be 64° C., when measured using DSC with heating rate 10 degrees C./min.

In an example, ethylene-butene has density of 0.862 g/cm$^3$ according to ASTM D792 standard. Melt index may be 1.2 g/10 min, when measured at 190° C./2.16 kg according to ASTM D1238. Melting peak may be 34° C., when measured using DSC with heating rate 10 degrees C./min.

In an example, ethylene-butene has density of 0.865 g/cm$^3$ according to ASTM D792 standard. Melt index may be 5 g/10 min, when measured at 190° C./2.16 kg according to ASTM D1238. Melting peak may be 35° C., when measured using DSC with heating rate 10 degrees C./min.

In an example, ethylene-butene has density of 0.885 g/cm$^3$ according to ASTM D792 standard. Melt index may be 2 g/10 min, when measured at 190° C./2.16 kg according to ASTM D1238. Melting peak may be 75° C., when measured using DSC with heating rate 10 degrees C./min.

In an example, ethylene-butene elastomer may be at least one of the following having density 0.855 g/cm$^3$ and MFR 2.0 g/10 min; density 0.885 g/cm$^3$ and MFR 2.5 g/10 min; density 0.874 g/cm$^3$ and MFR 0.8 g/10 min; density 0.865 g/cm$^3$ and MFR 5.0 g/10 min; and density 0.862 g/cm$^3$ and MFR 3.6 g/10 min.

An amount of ethylene-butene elastomer(s) may be between 2 and 30 wt. %, preferably between 5 and 20 wt. %, or between 10 and 15 wt. %. Ethylene-butene elastomers may have effect on flexibility of the facestock providing better conformability for the labels. Flexibility may be provided especially in the cross direction (CD) of the facestock.

In an example, core layer includes a modifier comprising or consisting of butene-1 homopolymer(s).

For example, butene-1 homopolymer has density of 0.915 g/cm$^3$ according to ISO 1183 standard. Melt flow rate may be 15 g/10 min, when measured at 190° C./2.16 kg according to ISO 1133. Melting temperature may be 114° C.

For example, butene-1 homopolymer has density of 0.914 g/cm$^3$ according to ISO 1183 standard. Melt flow rate may be 0.4 g/10 min, when measured at 190° C./2.16 kg according to ISO 1133. Melting temperature may be 117° C.

For example, butene-1 homopolymer has density of 0.915 g/cm$^3$ according to ISO 1183 standard. Melt flow rate may be 4 g/10 min, when measured at 190° C./2.16 kg according to ISO 1133. Melting temperature may be 116° C.

An amount of butene-1 homopolymer elastomer may be between 2 and 30 wt. %, preferably between 5 and 20 wt. %, or between 10 and 15 wt. %.

In an example, the core layer includes a modifier comprising or consisting of propylene based elastomer.

For example, density of propylene based elastomer is 0.868 g/cm$^3$, when measured according to standard ASTM D792. Melt flow rate at 230° C./2.16 kg may be 25 g/10 min, when measured according to standard ASTM D1238. Vicat softening temperature may be 51° C., when measured according to standard ASTM D1525.

For example, density of propylene based elastomer is 0.867 g/cm$^3$, when measured according to standard ASTM D792. Melt flow rate at 230° C./2.16 kg may be 8 g/10 min, when measured according to standard ASTM D1238. Vicat softening temperature may be 42° C., when measured according to standard ASTM D1525. Glass transition temperature may be −27° C. Total crystallinity may be 11%.

For example, density of propylene based elastomer is 0.863 g/cm$^3$, when measured according to standard ASTM D792. Melt flow rate at 230° C./2.16 kg may be 8 g/10 min, when measured according to standard ASTM D1238. Vicat softening temperature may be <20° C., when measured according to standard ASTM D1525. Glass transition temperature may be −29.8° C. Total crystallinity may be 14%.

For example, density of propylene based elastomer is 0.867 g/cm$^3$, when measured according to standard ASTM D792. Melt flow rate at 230° C./2.16 kg may be 2 g/10 min, when measured according to standard ASTM D1238. Vicat softening temperature may be 43° C., when measured according to standard ASTM D1525. Glass transition temperature may be −27° C. Total crystallinity may be 13%.

An amount of propylene based elastomer may be between 2 and 30 wt. %, preferably between 5 and 20 wt. %, or between 10 and 15 wt. %.

In an example, the core layer includes a modifier comprising or consisting of propylene-butene plastomer. In an example, propylene-butene plastomer has density of 0.890 g/cm$^3$ according to ISO 1183 standard. Melt flow rate may be 0.8 g/10 min, when measured at 190° C./2.16 kg according to ISO 1133. Melting temperature may be 114° C., when measured according to ISO 11357/3 standard.

An amount of propylene-butene plastomer may be between 2 and 30 wt. %, preferably between 5 and 20 wt. %, or between 10 and 15 wt. %. Propylene-butene plastomer may have effect on the elasticity of the facestock. It may also have effect on transparency.

In an example, the core layer includes a modifier comprising or consisting of propylene-ethylene plastomer.

For example, propylene-ethylene plastomer has density of 0.876 g/cm$^3$ according to ASTM D729 standard. Melt flow rate may be 8 g/10 min, when measured at 230° C./2.16 kg according to ASTM D1238. Melting temperature may be 85° C., and glass transition temperature −23° C. Total crystallinity may be 30%.

For example, propylene-ethylene plastomer has density of 0.876 g/cm$^3$ according to ASTM D729 standard. Melt flow rate may be 2 g/10 min, when measured at 230° C./2.16 kg according to ASTM D1238. Melting temperature may be 82.2° C., and glass transition temperature −24° C. Total crystallinity may be 21%.

An amount of propylene-ethylene plastomer may be between 2 and 30 wt. %, preferably between 5 and 20 wt. %, or between 10 and 15 wt. %.

In an example, the core layer includes a modifier comprising or consisting of olefin block copolymer, such as ethylene-octene block copolymer. In an example, ethylene-octene block copolymer is provided by chain-shuttling polymerization (dual catalyst system) resulting olefin block copolymers with alternating semicrystalline and amorphous segments.

According to an example, ethylene octene block copolymer has density of 0.877 g/cm$^3$, when measured according to standard ASTM D792. Melt index may be 5.0 g/10 min when measured at 190° C./2.16 kg according to standard ASTM D1238. Melting temperature may be 122° C. based on DCS measurement (differential scanning calorimetry).

According to an example, ethylene octene block copolymer has density of 0.866 g/cm$^3$, when measured according to standard ASTM D792. Melt index may be 5.0 g/10 min when measured at 190° C./2.16 kg according to standard ASTM D1238. Melting temperature may be 119° C. based on DCS measurement.

According to an example, ethylene octene block copolymer may have density of 0.887 g/cm$^3$, when measured according to standard ASTM D792. Melt index may be 5.0 g/10 min when measured at 190° C./2.16 kg according to standard ASTM D1238. Melting temperature may be 119° C. based on DCS measurement.

According to an example, ethylene octene block copolymer may be at least one of the following having density 0.877 g/cm$^3$ and MFR 1.0 g/10 min; density 0.866 g/cm$^3$ and MFR 1.0 g/10 min; density 0.869 g/cm$^3$ and MFR 0.5 g/10 min.

An amount of ethylene octene block copolymer may be between 2 and 30 wt. %, preferably between 5 and 20 wt. %, or between 10 and 15 wt. %.

According to an embodiment, the core layer includes a modifier consisting of ethylene-butene elastomer, ethylene-octene elastomer, propylene based elastomer, butene-1 homopolymer, propylene-butene plastomer, propylene-ethylene plastomer, or ethylene-octene block copolymer. Total amount of the modifier is between 2 and 30 wt. %, preferably between 5 and 20 wt. %, or between 10 and 15 wt. %.

According to an embodiment, a core layer includes a modifier consisting of at least one of the following: ethylene-butene elastomer, ethylene-octene elastomer, propylene based elastomer, butene-1 homopolymer, propylene-ethylene plastomer, propylene-butene plastomer, and ethylene-octene block copolymer. Total amount of the modifier is between 2 and 30 wt. %, preferably between 5 and 20 wt. %, or between 10 and 15 wt. %.

According to an embodiment, a core layer includes a modifier consisting of at least one of the following: ethylene-butene elastomer, ethylene-octene elastomer, and ethylene-octene block copolymer. Total amount of the modifier is between 2 and 30 wt. %, preferably between 5 and 20 wt. %, or between 10 and 15 wt. %.

Additives

According to an embodiment, the core layer further comprises additives. The core layer may include crystallization nucleator(s) or olefin block copolymer additive. The additives may have effect on clarity of the facestock. In example, they may reduce haze and thus improve clarity of the facestock.

In an example, the core layer includes polypropylene compound comprising nucleating agent, such as Bis(4-propylbenzylidene) propyl sorbitol. In the polypropylene compound an amount of the nucleating agent may be 10%. Amount of polypropylene compound comprising nucleating agent may be between 2 and 10 wt. %, or between 2 and 5 wt. %.

In an example, the core layer includes polypropylene compound comprising phosphate type nucleating agent e.g. aluminium hydroxybis{2,2'-methylenebis[4,6-di(tert-butyl)phenyl]phosphate}. Amount polypropylene compound comprising nucleating agent may be between 2 and 10 wt. %, or between 2 and 5 wt. %.

In an example, the core layer includes olefin copolymer additive, such as propylene-ethylene block copolymer made with chain-grafting catalyst technology and comprising isotactic polypropylene segments and crystalline polyethylene segments. An amount of propylene-ethylene block copolymer additive may be between 2 and 10 wt. %, or between 2 and 5 wt. %.

In an example, the core layer comprises a modifier consisting of ethylene-octene copolymer and an additive of propylene-ethylene block copolymer. Total amount of the modifier and the additive may be between 5 and 20 wt. %, or between 10 and 20 wt. %. In an example, an amount of ethylene-octene copolymer is between 8 and 15 wt. %, or between 10 and 15 wt. %. In an example, an amount of propylene-ethylene block copolymer is between 2 and 10 wt. %, or between 2 and 5 wt. %. Propylene-ethylene block copolymer, may have effect on clarity of the facestock. In example, it reduces the haze and thus improves the clarity.

In addition, the core layer may further comprise minor amount of other additives e.g. antioxidant/processing stabilizer comprising a blend of phenolic and phosphite antioxidants in LDPE carrier. Total amount of phenolic and phosphite antioxidants in the blend is 20%. In an example, MFR for the blend is 2.8 at 190° C./2.16 kg density 0.92 g/cm$^3$. An amount of other additives, for example, a blend of antioxidants and LDPE may be at most 2 wt. %, for example between 0.5 and 2 wt. %.

According to an embodiment, the core layer may comprise one or more pigments or inorganic fillers as an additive to provide the facestock with a desired colour. Fillers may include, for example, titanium dioxide, calcium carbonate and blends thereof. Carbon black may be introduced to provide a black or grey facestock. An amount of pigment may be at most 20 wt. %. If the core layer includes pigment the amount of main polymer is reduced in proportion, for example at most 20 wt. %.

The core layer compositions presented above may be used in multilayer facestock structures provided in Examples below. The core layer composition may have effect on providing good die-cutting properties, good stiffness and low haze for the multilayer face stock.

First Skin

In a multilayer face structure at least a first skin layer is printable i.e. the skin layer has sufficient surface energy, such as between 36 and 60 dynes/cm, providing efficient printing and adherence of the printing.

According to an embodiment a first skin layer comprises at least the following components: propylene homopolymer(s) and linear low density polyethylene.

The first skin layer may further comprise minor amount of additives, such as antioxidant and/or antiblocking agent.

Propylene Homopolymer

The first skin layer may comprise total amount of propylene homopolymer between 40 and 70 wt. %, or between 50 and 60 wt. %. Total amount of propylene homopolymer may include one type of propylene homopolymer or a mixture of at least two different propylene homopolymers. Mixture of propylene homopolymers may have effect on providing more optimized flow properties of the skin layer, thus ensuring skin layer quality required for e.g. subsequent printing process.

The propylene homopolymer may have melt flow rate (MFR) between 2 and 25 g/10 min, or between 8 and 25 g/10 min, when measured at 230° C./2.16 kg according to standard ISO 1133. Density may be 0.900 g/cm$^3$, when measured according to standard ISO 1183. Vicat softening temperature may be between 151 and 155 degrees C. (A50 (50° C./h 10N)), when measured according to standard ISO 306 standard. The propylene homopolymer melt flow rate between 8 and 25 g/10 min may have effect on flow properties in the first skin layer.

In an example, the propylene homopolymer has very narrow molecular weight distribution. Melt flow rate (MFR) may be 25 g/10 min, when measured at 230° C./2.16 kg according to ISO 1133 standard. Vicat softening temperature (A50 (50° C./h 10N)) may be 151° C. according to standard ISO 306. Vicat softening temperature (B50 (50° C./h 50N)) may be 92° C. according to standard ISO 306.

In an example, the propylene homopolymer has very narrow molecular weight distribution. Melt flow rate (MFR) may be 25 g/10 min when measured at 230° C./2.16 kg according to ISO 1133 standard. Vicat softening temperature (A50 (50° C./h 10N)) may be 153° C. according to standard ISO 306. Vicat softening temperature (B50 (50° C./h 50N)) may be 93° C. according to standard ISO 306.

In an example, the propylene homopolymer comprises MFR 8 g/10 min at 230° C./2.16 kg according to ISO 1133 standard. Density may be 0.900 g/cm$^3$ according to ISO 1183 standard. Vicat softening temperature (A50 (50° C./h 10N)) may be 152° C. according to standard ISO 306.

In an example, the propylene homopolymer has melt flow rate (MFR) 7.5 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer has MFR 3 g/10 min, when measured at 230° C./2.16 kg according to standard ISO 1133. Density may be 0.900 g/cm$^3$, when measured according to standard ISO 1183. Vicat softening temperature may be 154 degrees C. (A50 (50° C./h 10N)), when measured according to ISO 306 standard.

In an example, the propylene homopolymer has MFR 2 g/10 min, when measured at 230° C./2.16 kg according to standard ISO 1133. Density may be 0.900 g/cm$^3$, when measured according to standard ISO 1183. Vicat softening temperature may be 155 degrees C. (A50 (50° C./h 10N)), when measured according to ISO 306 standard.

According to an example, the first skin layer comprises a propylene homopolymer mixture comprising between 20 and 40 wt. %, or between 25 and 35 wt. % of a first propylene homopolymer. The first homopolymer may comprise MFR 25 g/10 min when measured at 230° C./2.16 kg according to ISO 1133 standard. Vicat softening temperature (A50 (50° C./h 10N)) may be between 151 and 153° C. according to standard ISO 306. Further, the mixture comprises between 20 and 35 wt. %, or between 25 and 30 wt. % of a second propylene homopolymer. The second propylene homopolymer may comprise MFR between 7.5 and 8 g/10 min at 230° C./2.16 kg according to ISO 1133 standard. Density may be 0.900 g/cm$^3$ according to ISO 1183 standard. Vicat softening temperature (A50 (50° C./h 10N)) may be 152° C. according to standard ISO 306.

The propylene homopolymers may have effect on increasing the stiffness of the facestock.

Linear Low Density Polyethylene

In addition to polypropylene(s) the first skin layer further comprises linear low density polyethylene (LLDPE). Total amount of LLDPE may be between 25 and 60 wt. %, between 35 and 55 wt. %, or between 40 and 50 wt. %.

In an example, LLDPE is Ziegler-Natta (Z-N) catalysed. Z—N catalysed LLDPE may comprise molecular weight distribution $M_w/M_n$ between 3 and 4, between 3.5 and 4 or between 3.5 and 3.8. $M_w$ refers to weight average molecular weight and $M_n$ to number average molecular weight. Z—N catalysed LLDPE may comprise melt index between 0.5 and 25 g/10 min, or between 1 and 6 g/10 min, preferably between 0.5 and 5 or between 2 and 5 g/10 min, when measured at 190° C./2.16 kg according to standard ASTM D 1238. Density may be between 0.917 and 0.941 g/cm³, or between 0.925 and 0.940 g/cm³, preferably between 0.930 and 0.940 g/cm³, when measured according to standard ASTM D 792. Vicat softening point may be between 92 and 125° C., or between 110 and 120° C., when measured according to standard ASTM D1525. Melting temperature may be between 119 and 128° C. Z—N catalysed LLDPE may have effect on heat stability of the facestock.

For example, Z—N catalysed LLDPE may have melt index 2.5 g/10 min when measured at 190° C./2.16 kg according to standard ASTM D 1238. Density may be between 0.930 and 0.940 g/cm³, when measured according to standard ASTM D 792. Vicat softening point may be 118° C., when measured according to standard ASTM D1525.

For example, Z—N catalysed LLDPE may have melt index 1 g/10 min when measured at 190° C./2.16 kg according to standard ASTM D 1238. Density may be 0.922 g/cm³, when measured according to standard ASTM D 792. Vicat softening point may be 109° C., when measured according to standard ASTM D1525.

For example, Z—N catalysed LLDPE may have melt index 2 g/10 min when measured at 190° C./2.16 kg according to standard ASTM D 1238. Density may be 0.926 g/cm³, when measured according to standard ASTM D 792. Vicat softening point may be 109° C., when measured according to standard ASTM D1525.

For example, Z—N catalysed LLDPE may have melt index 6 g/10 min when measured at 190° C./2.16 kg according to standard ASTM D 1238. Density may be 0.919 g/cm³, when measured according to standard ASTM D 792. Vicat softening point may be 97.8° C., when measured according to standard ASTM D1525.

For example, Z—N catalysed LLDPE may have melt index 25 g/10 min when measured at 190° C./2.16 kg according to standard ASTM D 1238. Density may be 0.920 g/cm³, when measured according to standard ASTM D 792. Vicat softening point may be 92° C., when measured according to standard ASTM D1525.

In an example, LLDPE is metallocene catalysed (m-LLDPE) linear low density polyethylene or a mixture of metallocene catalysed LLDPEs. m-LLDPE may comprise molecular weight distribution $M_w/M_n$ less than 2.5, for example between 1.5 and 2.5 or between 1.95 and 2.15. $M_w$ refers to weight average molecular weight and $M_n$ to number average molecular weight.

In addition, metallocene catalysed LLDPE(s) may have melt index between 0.85 and 22 g/10 min, when measured at 190° C./2.16 kg according to standard ASTM D1238. Density may be between 0.908 and 0.941 g/cm³, when measured according to standard ASTM D729. Vicat softening point may be between 81 and 111° C., when measured according to standard ASTM D1525. Melting temperature may be between 96 and 129° C.

Alternatively, metallocene catalysed LLDPE(s) may have melt flow rate between 0.5 and 10, between 0.5 and 5, or between 2 and 5 g/10 min in 190° C., when measured according to standard ISO 1133. Density may be between 0.930 and 0.950 g/cm³ according to test method ISO 1183. Vicat softening point may be between 110 and 125° C. according to test method ISO 306. Melting point may be between 120 and 135° C. according to test method ISO 11357-3. Metallocene catalysed LLDPE(s) may have effect on providing good layer-to-layer adhesion. They may also have effect on providing low haze.

For example, metallocene catalysed LLDPE may have melt flow rate (MFR) 2.8 g/10 min in 190° C. according to test method ISO 1133. Density may be greater than 0.930 g/cm³, e.g. between 0.930 and 0.950 g/cm³, preferably 0.946 g/cm³ according to test method ISO 1183. Vicat softening point may be 120° C. according to test method ISO 306. Melting point may be 131° C. according to test method ISO 11357-3.

For example, the metallocene catalysed LLDPE may have MFR 3.8 g/10 min in 190° C. according to test method ISO 1133. Density may be greater than 0.930 g/cm³, for example 0.938 g/cm³ according to test method ISO 1183. Vicat softening point may be 114° C. according to test method ISO 306. Melting point may be 127° C. according to test method ISO 11357-3.

For example, the metallocene catalysed LLDPE may have melt index 0.85 g/10 min, when measured at 190° C./2.16 kg according to standard ASTM D1238. Density may be 0.920 g/cm³, when measured according to standard ASTM D729. Vicat softening point may be 106° C., when measured according to standard ASTM D1525. Melting temperature may be 123° C.

For example, the metallocene catalysed LLDPE may have melt index 1.5 g/10 min, when measured at 190° C./2.16 kg according to standard ASTM D1238. Density may be 0.914 g/cm³, when measured according to standard ASTM D729. Vicat softening point may be 97° C., when measured according to standard ASTM D1525. Melting temperature may be 122° C.

For example, the metallocene catalysed LLDPE may have melt index 4.0 g/10 min, when measured at 190° C./2.16 kg according to standard ASTM D1238. Density may be 0.916 g/cm³, when measured according to standard ASTM D729. Melting temperature may be 122° C.

For example, the metallocene catalysed LLDPE may have melt index 8 g/10 min, when measured at 190° C./2.16 kg according to standard ASTM D1238. Density may be 0.919 g/cm³, when measured according to standard ASTM D729. Vicat softening point may be 102° C., when measured according to standard ASTM D1525. Melting temperature may be 124° C.

For example, the metallocene catalysed LLDPE may have melt index 22 g/10 min, when measured at 190° C./2.16 kg according to standard ASTM D1238. Density may be 0.908 g/cm³, when measured according to standard ASTM D729. Vicat softening point may be 81° C., when measured according to standard ASTM D1525. Melting temperature may be 96° C.

Linear low density polyethylenes having lower melt index or MFR, for example, between 0.5 and 2 g/10 min may be used for blown films. LLDPEs having higher melt index, for example, between 2 and 5 g/10 min may be used for cast films. Melt index between 2 and 5 g/10 min may have effect on providing controlled gauge variation and uniform thickness profile.

Additives

The first skin layer may further comprises compound of antiblocking agent between 0.5 and 2 wt. %. The compound may have density of 0.9 g/cm³. The antiblocking agent may comprise 10% silica in propylene homopolymer carrier. An amount of antiblocking agent in the first skin layer may be between 0.05 and 0.2 wt. %. Alternatively, the compound of antiblocking agent may comprise synthetic silica in polyethylene carrier.

The first skin layer may further comprises minor amount of other additives e.g. antioxidant/processing stabilizer. The antioxidant may be a blend of phenolic and phosphite antioxidants in LDPE carrier. An amount of the antioxidant compound may be between 0.5 and 3 wt. %. Total amount of antioxidants in the compound is 20%. An amount of antioxidant(s) in the first skin layer may be between 0.1 and 0.6 wt. %. MFR for the antioxidant compound may be 2.8 at 190° C./2.16 kg and density 0.92 g/cm$^3$.

The first skin layer comprising propylene homopolymer and Z—N catalysed linear low density polyethylene may have effect on maintenance of good stiffness and low haze of the multilayer face stock. The first skin layer have further effect on printability of the face stock. However it may have effect on providing reduced interlayer adhesion between the skin layer and the core layer.

The first skin layer comprising propylene homopolymer and metallocene catalysed LLDPE may have effect on providing a good balance of low haze, high stiffness and excellent inter-layer adhesion. It may also have effect on providing good ink adhesion.

For example, in testing the layer-to-layer adhesion of the first skin layer comprising metallocene catalysed LLDPE(s) and propylene hompolymer to the core layer comprising propylene homopolymer, low density polyethylene, and a modifier consisting of at least one of the following: olefin elastomer, olefin plastomer and olefin block copolymer, such as ethylene-octene elastomer, no delamination was detected According to another embodiment, a first skin layer mainly consists of linear low density polyethylene(s) LLDPE. The first skin layer may further comprise minor amounts of additives, such as antioxidant and/or antiblocking agent. The first skin layer may include between 90 and 99 wt. %, or between 95 and 99 wt. % of LLDPE(s). The first skin layer may further comprises minor amount of additives, for example between 0.5 and 5 wt. %, or between 1 and 3 wt. %.

In an example, the first skin layer mainly consists of at least one metallocene catalysed linear low density polyethylene LLDPE (m-LLDPE). In an example the first skin layer includes between 90 and 99 wt. %, or between 95 and 99 wt. % of metallocene catalysed LLDPE(s). The first skin layer may further comprise minor amount of antioxidant and antiblocking agent.

In an example, the first skin layer mainly consists of metallocene catalysed LLDPE(s) comprising molecular weight distribution $M_w/M_n$ less than 2.5, for example between 1.5 and 2.5 or between 1.95 and 2.15.

Metallocene catalysed LLDPE(s) may have melt index between 0.85 and 22 g/10 min, when measured at 190° C./2.16 kg according to standard ASTM D1238. Density may be between 0.908 and 0.941 g/cm$^3$, when measured according to standard ASTM D729. Vicat softening point may be between 81 and 111° C., or between ° C., when measured according to standard ASTM D1525. Melting temperature may be between 96 and 129° C.

Alternatively, metallocene catalysed LLDPE(s) may have melt flow rate between 2 and 10, or between 2 and 5 g/10 min in 190° C. according to test method ISO 1133. Density may be between 0.930 and 0.950 g/cm$^3$ according to test method ISO 1183. Vicat softening point may be between 110 and 125° C. according to test method ISO 306. Melting point may be between 120 and 135° C. according to test method ISO 11357-3.

In an example, metallocene catalysed LLDPE may have MFR 2.8 g/10 min in 190° C. according to test method ISO 1133. Density may be greater than 0.930 g/cm$^3$, e.g. between 0.930 and 0.950 g/cm$^3$, preferably 0.946 g/cm$^3$ according to test method ISO 1183. Vicat softening point may be 120° C. according to test method ISO 306, and melting point may be 131° C. according to test method ISO 11357-3.

In an example, the metallocene catalysed LLDPE may have MFR 3.8 g/10 min in 190° C. according to test method ISO 1133. Density may be greater than 0.930 g/cm$^3$, for example 0.938 g/cm$^3$ according to test method ISO 1183. Vicat softening point may be 114° C. according to test method ISO 306, and melting point may be 127° C. according to test method ISO 11357-3.

In an example, the metallocene catalysed LLDPE may have melt index 0.85 g/10 min, when measured at 190° C./2.16 kg according to standard ASTM D1238. Density may be 0.920 g/cm$^3$, when measured according to standard ASTM D729. Vicat softening point may be 106° C., when measured according to standard ASTM D1525. Melting temperature may be 123° C.

In an example, the metallocene catalysed LLDPE may have melt index 1.5 g/10 min, when measured at 190° C./2.16 kg according to standard ASTM D1238. Density may be 0.914 g/cm$^3$, when measured according to standard ASTM D729. Vicat softening point may be 97° C., when measured according to standard ASTM D1525. Melting temperature may be 122° C.

In an example, the metallocene catalysed LLDPE may have melt index 4.0 g/10 min, when measured at 190° C./2.16 kg according to standard ASTM D1238. Density may be 0.916 g/cm$^3$, when measured according to standard ASTM D729. Melting temperature may be 122° C.

In an example, the metallocene catalysed LLDPE may have melt index 8 g/10 min, when measured at 190° C./2.16 kg according to standard ASTM D1238. Density may be 0.919 g/cm$^3$, when measured according to standard ASTM D729. Vicat softening point may be 102° C., when measured according to standard ASTM D1525. Melting temperature may be 124° C.

In an example, the metallocene catalysed LLDPE may have melt index 22 g/10 min, when measured at 190° C./2.16 kg according to standard ASTM D1238. Density may be 0.908 g/cm$^3$, when measured according to standard ASTM D729. Vicat softening point may be 81° C., when measured according to standard ASTM D1525. Melting temperature may be 96° C.

The first skin layer consisting of metallocene LLDPE(s) may have effect of on providing good layer-to-layer adhesion. They may further have effect on providing low haze. The first skin layer consisting of a mixture of metallocene catalysed LLDPES may further have effect on printability and layer-to-layer adhesion.

According to another example, the first skin layer consists of a mixture of linear low density polyethylenes, such as metallocene catalysed LLDPE(s) and Ziegler-Natta catalysed LLDPE(s).

The first skin layer may comprise metallocene catalysed LLDPE(s) between 45 and 70 wt. %, or between 50 and 60 wt. %. Metallocene catalysed LLDPE(s) may comprise molecular weight distribution $M_w/M_n$ less than 2.5, for example between 1.5 and 2.5 or between 1.95 and 2.15.

In addition, metallocene catalysed LLDPE may have melt index between 0.85 and 22 g/10 min, when measured at 190° C./2.16 kg according to standard ASTM D1238. Density may be between 0.908 and 0.941 g/cm$^3$, when measured according to standard ASTM D729. Vicat softening point may be between 81 and 111° C., when measured according to standard ASTM D1525. Melting temperature may be between 96 and 129° C.

Alternatively, m-LLDPE may have melt flow rate between 2 and 10, or between 2 and 5 g/10 min in 190° C.

according to test method ISO 1133. Density may be between 0.930 and 0.950 g/cm³ according to test method ISO 1183. Vicat softening point may be between 110 and 125° C. according to test method ISO 306. Melting point may be between 120 and 135° C. according to test method ISO 11357-3.

Metallocene LLDPE(s) may have effect of on providing good layer-to-layer adhesion. They may further have effect on providing low haze.

For example, metallocene catalysed LLDPE may have melt flow rate (MFR) 2.8 g/10 min in 190° C. according to test method ISO 1133. Density may be greater than 0.930 g/cm³, e.g. between 0.930 and 0.950 g/cm³, preferably 0.946 g/cm³ according to test method ISO 1183. Vicat softening point may be 120° C. according to test method ISO 306. Melting point may be 131° C. according to test method ISO 11357-3.

For example, the metallocene catalysed LLDPE may have MFR 3.8 g/10 min in 190° C. according to test method ISO 1133. Density may be greater than 0.930 g/cm³, for example 0.938 g/cm³ according to test method ISO 1183. Vicat softening point may be 114° C. according to test method ISO 306. Melting point may be 127° C. according to test method ISO 11357-3.

For example, the metallocene catalysed LLDPE may have melt index 0.85 g/10 min, when measured at 190° C./2.16 kg according to standard ASTM D1238. Density may be 0.920 g/cm³, when measured according to standard ASTM D729. Vicat softening point may be 106° C., when measured according to standard ASTM D1525. Melting temperature may be 123° C.

For example, the metallocene catalysed LLDPE may have melt index 1.5 g/10 min, when measured at 190° C./2.16 kg according to standard ASTM D1238. Density may be 0.914 g/cm³, when measured according to standard ASTM D729. Vicat softening point may be 97° C., when measured according to standard ASTM D1525. Melting temperature may be 122° C.

For example, the metallocene catalysed LLDPE may have melt index 4.0 g/10 min, when measured at 190° C./2.16 kg according to standard ASTM D1238. Density may be 0.916 g/cm³, when measured according to standard ASTM D729. Melting temperature may be 122° C.

For example, the metallocene catalysed LLDPE may have melt index 8 g/10 min, when measured at 190° C./2.16 kg according to standard ASTM D1238. Density may be 0.919 g/cm³, when measured according to standard ASTM D729. Vicat softening point may be 102° C., when measured according to standard ASTM D1525. Melting temperature may be 124° C.

For example, the metallocene catalysed LLDPE may have melt index 22 g/10 min, when measured at 190° C./2.16 kg according to standard ASTM D1238. Density may be 0.908 g/cm³, when measured according to standard ASTM D729. Vicat softening point may be 81° C., when measured according to standard ASTM D1525. Melting temperature may be 96° C.

The mixture of linear low density polyethylenes in the first skin layer further comprises Ziegler-Natta catalysed linear low density polyethylene (Z—N LLDPE). Z—N catalysed LLDPE may comprise molecular weight distribution $M_w/M_n$ between 3 and 4, between 3.5 and 4 or between 3.5 and 3.8. $M_w$ refers to weight average molecular weight and $M_n$ to number average molecular weight. An amount of the Z—N catalysed LLDPE may be between 30 and 50 wt. %, or between 35 and 45 wt. %.

Z—N catalysed LLDPE may comprise melt index between 0.5 and 25 g/10 min, or between 1 and 6 g/10 min, preferably between 2 and 5 g/10 min, when measured at 190° C./2.16 kg according to standard ASTM D 1238. Density may be between 0.917 and 0.941 g/cm³, or between 0.925 and 0.940 g/cm³, preferably between 0.930 and 0.940 g/cm³, when measured according to standard ASTM D 792. Vicat softening point may be between 92 and 125° C., or between 110 and 120° C., when measured according to standard ASTM D1525. Melting temperature may be between 119 and 128° C. Z—N catalysed LLDPE may have effect on heat stability of the facestock.

For example, Z—N catalysed LLDPE may have melt index 2.5 g/10 min when measured at 190° C./2.16 kg according to standard ASTM D 1238. Density may be between 0.930 and 0.940 g/cm³, when measured according to standard ASTM D 792. Vicat softening point may be 118° C., when measured according to standard ASTM D1525.

For example, Z—N catalysed LLDPE may have melt index 1 g/10 min when measured at 190° C./2.16 kg according to standard ASTM D 1238. Density may be 0.922 g/cm³, when measured according to standard ASTM D 792. Vicat softening point may be 109° C., when measured according to standard ASTM D1525.

For example, Z—N catalysed LLDPE may have melt index 2 g/10 min when measured at 190° C./2.16 kg according to standard ASTM D 1238. Density may be 0.926 g/cm³, when measured according to standard ASTM D 792. Vicat softening point may be 109° C., when measured according to standard ASTM D1525.

For example, Z—N catalysed LLDPE may have melt index 6 g/10 min when measured at 190° C./2.16 kg according to standard ASTM D 1238. Density may be 0.919 g/cm³, when measured according to standard ASTM D 792. Vicat softening point may be 97.8° C., when measured according to standard ASTM D1525.

For example, Z—N catalysed LLDPE may have melt index 25 g/10 min when measured at 190° C./2.16 kg according to standard ASTM D 1238. Density may be 0.920 g/cm³, when measured according to standard ASTM D 792. Vicat softening point may be 92° C., when measured according to standard ASTM D1525.

The first skin layer compositions according to embodiments presented above may further comprises compound of antiblocking agent between 0.5 and 2 wt. % comprising synthetic silica in polyethylene carrier.

The first skin layer compositions according to embodiments presented in previous may further comprises minor amount of other additives e.g. antioxidant/processing stabilizer. The antioxidant may be a blend of phenolic and phosphite antioxidants in LDPE carrier. An amount of the antioxidant compound may be between 0.5 and 3 wt. %. Total amount of antioxidants in the compound is 20%. An amount of antioxidant(s) in the first skin layer may be between 0.1 and 0.6 wt. %. MFR for the antioxidant compound may be 2.8 at 190° C./2.16 kg and density 0.92 g/cm³.

At least some/all first skin layer compositions presented above may have effect on providing improved ink-adhesion. They may also have effect on layer-to-layer adhesion and thus avoiding delamination of the print skin layer from the core layer comprising propylene homopolymer, low density polyethylene, and a modifier consisting of at least one of the following: olefin elastomer, olefin plastomer, and olefin block copolymer, such as ethylene-octene elastomer.

The skin layer composition consisting of propylene homopolymer(s), linear low density polyethylene and minor amount of antioxidant, and the first skin layer composition consisting mainly of linear low density polyethylene(s) and minor amount of antioxidant may have effect on providing easier mixing of the skin layer composition during extrusion. It may also have effect on reducing blade out effect during orientation. In other words, migration and/or transfer of particles form the film surface to orientation machinery, like rubber nip roll, may be reduced or avoided. The specific skin layer composition may also have effect on reducing air trapping and thus providing tighter rolls during winding of the face stock. Further, better contact with the gravure/anilox roller without particle contamination may be achieved providing smoother top coating for the skin layer. The skin layer composition may also have effect on enabling gravure and screen printing even without top coat. Also better die-cutting and less die wear may be achieved.

The first skin layer composition consisting of propylene homopolymer(s), linear low density polyethylene and minor amount of antioxidant, and the first skin layer composition consisting mainly of linear low density polyethylene(s) and minor amount of antioxidant may have effect on providing low internal haze for the facestock. In an example, internal haze (D65/10°) of the multilayer facestock may be less than 5, for example between 4 and 6.5 or between 5.5 and 6.5.

At least some/all first skin layer compositions may also have effect on providing smooth surface quality and high print image quality. In addition, they may have effect on improving scuff-resistance of labelled containers when in service and on bottling lines. They may further have effect on enabling silk-screen printing.

Second Skin

In a multilayer facestock structure a second skin layer preferably has a composition close to the composition of the core layer.

According to an embodiment, a second skin layer, also referred to as an adhesive receiving skin layer, comprises at least the following components: propylene homopolymer, a modifier comprising at least one of the following: olefin elastomer, olefin plastomer and olefin block copolymer, such as ethylene-octene block copolymer; linear low density polyethylene, and low density polyethylene. In addition, the second skin layer may comprise minor amount of additives, such as antiblocking agent and/or antioxidant.

Propylene Homopolymer

One of the polymer components in the second skin layer is propylene homopolymer. An amount of propylene homopolymer may be between 40 and 70 wt. %, or preferably between 50 and 70 wt. %. Total amount of propylene homopolymer may include one type of propylene homopolymer or a mixture of at least two different propylene homopolymers. Mixture of propylene homopolymers may have effect on providing optimized flow properties of the skin layer. The propylene homopolymer may have melt flow rate (MFR) between 2 and 25 g/10 min, or between 2 and 8 g/10 min, when measured at 230° C./2.16 kg according to standard ISO 1133. The propylene homopolymer may have melt flow rate preferably between 2 and 7 g/10 min or between 3 and 6 g/10 min, when measured at 230° C./2.16 kg according to standard ISO 1133. Melt flow rate between 2 and 7 g/10 min may have effect on providing good flow properties for the second skin layer.

In an example, the propylene homopolymer has very narrow molecular weight distribution. Melt flow rate (MFR) may be 25 g/10 min, when measured at 230° C./2.16 kg according to ISO 1133 standard. Vicat softening temperature (A50 (50° C./h 10N)) may be 151° C. according to standard ISO 306. Vicat softening temperature (B50 (50° C./h 50N)) may be 92° C. according to standard ISO 306.

In an example, the propylene homopolymer has very narrow molecular weight distribution. Melt flow rate (MFR) may be 25 g/10 min when measured at 230° C./2.16 kg according to ISO 1133 standard. Vicat softening temperature (A50 (50° C./h 10N)) may be 153° C. according to standard ISO 306. Vicat softening temperature (B50 (50° C./h 50N)) may be 93° C. according to standard ISO 306.

In an example, the propylene homopolymer comprises MFR 8 g/10 min at 230° C./2.16 kg according to ISO 1133 standard, density 0.900 g/cm$^3$ according to ISO 1183 standard, Vicat softening temperature (A50 (50° C./h 10N)) 152° C. according to standard ISO 306. The propylene homopolymer may have effect on providing higher stiffness of the facestock.

In an example, the propylene homopolymer has melt flow rate (MFR) 7.5 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer comprises melt flow rate 6 g/10 min, when measured at 230° C./2.16 kg according to standard ISO 1133. Density may be 0.905 g/cm$^3$ according to ISO 1183 standard. Vicat softening temperature (A50 (50° C./h 10N)) may be 150° C. according to standard ISO 306. Melting point may be 164° C., according to standard ISO 3146.

In an example, the propylene homopolymer has MFR 3 g/10 min, when measured at 230° C./2.16 kg according to standard ISO 1133. Density may be 0.900 g/cm$^3$, when measured according to standard ISO 1183. Vicat softening temperature may be 154 degrees C. (A50 (50° C./h 10N)), when measured according to ISO 306 standard.

In an example, the propylene homopolymer has MFR 2 g/10 min, when measured at 230° C./2.16 kg according to standard ISO 1133. Density may be 0.900 g/cm$^3$, when measured according to standard ISO 1183. Vicat softening temperature may be 155 degrees C. (A50 (50° C./h 10N)), when measured according to ISO 306 standard.

Modifier

The second skin layer also comprises a modifier comprising at least one of the following: olefin elastomer, olefin plastomer and olefin block copolymer. Total amount of the modifier may be between 2 and 30 wt. %, preferably between 5 and 20 wt. % or between 10 and 15 wt. %

Olefin elastomer as a modifier may be at least one of the following random copolymer of ethylene-butene, also referred to as ethylene-butene elastomer, and random copolymer of ethylene-octene, also referred to as ethylene-octene elastomer. Random copolymer of ethylene-butene may comprise butene-1 with low, medium, or high ethylene content. Olefin elastomer may also comprise propylene based elastomers, such as propylene-ethylene copolymers, and/or butene-1 homopolymers. Butene-1 homopolymer may also be referred to as polybutene-1. Butene-1 is semi-crystalline homopolymer, which are compatible with polypropylene due its similar molecular structure.

Melt index of olefin elastomers, such as random copolymers comprising ethylene, at 190° C. may be between 0.5 and 30 g/10 min, preferably between 0.5 and 5, when measured according to standard ASTM D1238. Alternatively, melt flow rate at 190° C./2.16 kg may be between 2.5 and 4 g/10 min, when measured according to standard ISO 1133. Density may be between 0.857 and 0.915 g/cm$^3$, when measured according to standard ASTM D792. Alternatively, density may be between 0.897 and 0.911 g/cm$^3$, when measured according to standard ISO 1183. Glass transition temperature may be between −65 and −30° C. according to DSC measurements. Melting peak temperature may be between 34 and 120° C., according to DSC measurements using heating rate 10 degrees C./min. Total crystallinity may be between 10 and 15%.

Density of butene-1 homopolymer as an elastomer may be between 0.914 and 0.915 g/cm$^3$ according to ISO 1183 standard. Melt flow rate may be between 0.4 and 200 g/10 min, preferably between 0.4 and 15, or between 0.4 and 4 g/10 min, when measured at 190° C./2.16 kg according to ISO 1133. Melting temperature may be between 114 and 124° C.

Density of propylene based elastomer may be between 0.863 and 0.868 g/cm$^3$, when measured according to standard ASTM D792. Melt flow rate at 230° C./2.16 kg may be between 2 and 25 g/10 min, preferably between 2 and 8 g/10 min, when measured according to standard ASTM D1238. Glass transition temperature may be between −27 and −21° C. Melting peak temperature may be between 66 and 131° C. Total crystallinity may be between 11 and 14%.

Olefin plastomer as a modifier may be at least one of the following: propylene-ethylene plastomer and propylene-butene plastomer. Preferably the olefin plastomer is propylene-butene plastomer. Olefin plastomers may have narrow molecular weight distribution and broad crystallinity distribution. Molecular weight distribution ($M_w/M_n$) may be between 2 and 3. Melt flow rate (MFR) may be between 0.5 and 25 g/10 min (190° C./2.16 kg), when measured according to standard ISO 1133. Alternatively, melt flow rate may be between 2 and 25 g/10 min, when measured according to standard ASTM D 1238 at 230° C./2.16 kg. Density may be between 0.859 and 0.890 g/cm$^3$, when measured according to standard ASTM D 792. Co-monomer content may be between 5 and 15 wt. %. Glass transition temperature may be between −15 and −35 degrees C. Board crystallinity distribution resulting in broad melting behaviour and melting range being between 50 and 135 degrees C. Total crystallinity may be between 5 and 45%.

Olefin block copolymer as a modifier may be ethylene-octene block copolymer provided by chain-shuttling polymerization (dual catalyst system) resulting olefin block copolymers with alternating semicrystalline and amorphous segments. Density of the olefin block copolymer may be between 0.866 and 0.887 g/cm$^3$, when measured according to standard ASTM D729. Olefin block copolymers may have sharp melting peaks. Melting temperature may be between 118 and 122° C. Melt index may be between 0.5 and 15 g/10 min, when measured at 2.16 kg/190° C. according to standard ASTM D1238. Glass transition temperature may be between −65 and −54° C. Ethylene-octene block copolymer used as a modifier may have effect on providing better die-cutting properties of the facestock.

Examples for olefin elastomer, olefin plastomer and olefin block copolymer presented in previous in context with core layer composition are suitable for a modifier of the second skin layer.

According to an embodiment, a second skin layer includes a modifier consisting of at least one of the following: ethylene-butene elastomer, ethylene-octene elastomer, propylene based elastomer, butene-1 homopolymer, propylene-ethylene plastomer, propylene-butene plastomer, and ethylene-octene block copolymer. Total amount of the modifier is between 2 and 30 wt. %, preferably between 5 and 20 wt. %, or between 10 and 15 wt. %.

According to an embodiment, a second skin layer includes a modifier consisting of at least one of the following: ethylene-butene elastomer, ethylene-octene elastomer, and ethylene-octene block copolymer. Total amount of the modifier is between 2 and 30 wt. %, preferably between 5 and 20 wt. %, or between 10 and 15 wt. %.

Low Density Polyethylene

The second skin layer further comprises low density polyethylene (LDPE). An amount of low density polyethylene (LDPE) may between 1 and 10 wt. %, or between 3 and 7 wt. %.

LDPE may have melt flow rate (MFR) between 0.2 and 10, between 0.5 and 8, or preferably between 0.7 and 4 g/10 min, when measured at 190° C./2.16 kg using method according to standard ISO 1133. Density may be between 0.919 and 0.934, or between 0.920 and 0.928 g/cm$^3$, when measured using test method according to standard ISO 1183. Vicat softening temperature may be between 88 and 111, or between 95 and 105° C. A50 (50° C./h 10N), when measured using test method according to standard ISO 306.

Low density polyethylene having melt flow rate between 0.7 and 4 g/10 min, density between 0.920 and 0.928 g/cm$^3$, and Vicat softening point between 95 and 105° C. may have effect on providing enhanced converting properties for labels.

Examples for LDPE presented in previous in context with core layer composition are suitable for the second skin layer.

Linear Low Density Polyethylene

In addition, and different from the core layer composition, the second skin layer further comprises linear low density polyethylene, such as Ziegler-Natta catalysed linear low density polyethylene (Z—N LLDPE). An amount of the Z—N catalysed LLDPE may be between 10 and 30 wt. %, or between 15 and 25 wt. %. Z—N catalysed LLDPE may have effect on heat stability of the facestock.

Z—N catalysed LLDPE may comprise molecular weight distribution $M_w/M_n$ between 3 and 4, between 3.5 and 4 or between 3.5 and 3.8. $M_w$ refers to weight average molecular weight and $M_n$ to number average molecular weight. Z—N catalysed LLDPE may comprise melt index between 0.5 and 25 g/10 min, or between 1 and 6 g/10 min, preferably between 2 and 5 g/10 min, when measured at 190° C./2.16 kg according to standard ASTM D 1238. Density may be between 0.917 and 0.941 g/cm$^3$, or between 0.925 and 0.940, preferably between 0.930 and 0.940 g/cm$^3$, when measured according to standard ASTM D 792. Vicat softening point may be between 92 and 125° C., or between 110 and 120° C., when measured according to standard ASTM D1525. Melting temperature may be between 119 and 128° C. Examples for ZN-LLDPE presented in previous in context with first skin layer composition are suitable for the second skin layer.

Additives

The second skin layer compositions presented above may further comprises compound of antiblocking agent between 0.5 and 2 wt. %. The compound may have density of 0.9 g/cm$^3$. The antiblocking agent may comprise 10% silica in propylene homopolymer carrier. An amount of antiblocking agent in the second skin layer may be between 0.05 and 0.2 wt. % Alternatively, the compound of antiblocking agent may comprise synthetic silica in polyethylene carrier.

The second skin layer may further comprises minor amount of other additives e.g. antioxidant/processing stabilizer. The antioxidant may be a blend of phenolic and phosphite antioxidants in LDPE carrier. An amount of the antioxidant compound may be between 0.5 and 3 wt. %. Total amount of antioxidants in the compound is 20%. An amount of antioxidant(s) in the first skin layer may be between 0.1 and 0.6 wt. %. MFR for the antioxidant compound may be 2.8 at 190° C./2.16 kg and density 0.92 g/cm$^3$.

According to an embodiment, the second skin layer further comprises additives, such as crystallization nucleator(s) or olefin block copolymer additive. The additives may have effect on clarity of the facestock. In example, they may reduce haze and thus improve clarity of the facestock.

In an example, the second skin layer includes polypropylene compound comprising nucleating agent, such as Bis(4-propylbenzylidene) propyl sorbitol. In the polypropylene compound an amount of the nucleating agent may be 10%. Amount of polypropylene compound comprising nucleating agent may be between 2 and 10 wt. %, or between 2 and 5 wt. %.

In an example, the second skin layer includes polypropylene compound comprising phosphate type nucleating agent e.g. aluminium hydroxybis{2,2'-methylenebis[4,6-di(tert-butyl)phenyl]phosphate}. Amount polypropylene compound comprising nucleating agent may be between 2 and 10 wt. %, or between 2 and 5 wt. %.

In an example, the second skin layer includes olefin copolymer additive, such as propylene-ethylene block copolymer made with chain-grafting catalyst technology and comprising isotactic polypropylene segments and crystalline polyethylene segments. An amount of propylene-ethylene block copolymer may be between 2 and 10 wt. %, or between 2 and 5 wt. %.

In an example, the second skin layer comprises a modifier consisting of ethylene-octene copolymer and an additive of propylene-ethylene block copolymer. Total amount of the modifier and the additive may be between 5 and 20 wt. %, or between 10 and 20 wt. %. In an example, an amount of ethylene-octene copolymer is between 8 and 15 wt. %. In an example, an amount of propylene-ethylene block copolymer is between 2 and 10 wt. %.

Propylene-ethylene block copolymer, may have effect on clarity of the facestock. In example, it reduces the haze and thus improves the clarity.

Following are provided examples of multilayer facesotck structure.

Examples 1.1-1.6

In an example 1.1, the multilayer face stock comprises the layers in the following order:
- a printable first skin layer comprising or consisting of: propylene homopolymer(s), Z—N catalysed linear low density polyethylene, antioxidant, and/or antiblocking agent;
- a core layer comprising or consisting of: propylene homopolymer; a modifier consisting of at least one of the following: olefin elastomer, olefin plastomer and olefin block copolymer; low density polyethylene;
- an adhesive receiving second skin layer comprising or consisting of: propylene homopolymer(s); linear low density polyethylene; a modifier consisting of at least one of the following: olefin elastomer, olefin plastomer and olefin block copolymer; low density polyethylene; antiblocking agent; and antioxidant.

In an example 1.2, the multilayer face stock comprises the skin layers as presented in Example 1.1, and core layer comprises the modifier consisting of at least one of the following: ethylene-butene elastomer, ethylene-octene elastomer, propylene based elastomer, butene-1 homopolymer, propylene-ethylene plastomer, propylene-butene plastomer, and ethylene-octene block copolymer.

In an example 1.3, the multilayer face stock comprises the skin layers as presented in Example 1.1, and the core layer further comprises one of the following additives: polypropylene compound comprising Bis(4-propylbenzylidene) propyl sorbitol, polypropylene compound comprising phosphate type nucleating agent, and propylene-ethylene block copolymer.

In an example 1.4, the multilayer face stock comprises the skin layers as presented in Example 1.1, and the core layer comprises the modifier consisting of ethylene-octene elastomer and the core layer further comprises an additive of propylene-ethylene block copolymer.

In an example 1.5, the multilayer face stock comprises in the following order:
- a printable first skin layer consisting of: propylene homopolymer(s); Z—N catalysed linear low density polyethylene; antioxidant; and antiblocking agent;
- a core layer consisting of: propylene homopolymer; a modifier consisting of ethylene-octene elastomer; low density polyethylene; and an antioxidant;
- an adhesive receiving second skin layer consisting of propylene homopolymer; linear low density polyethylene; a modifier consisting of ethylene-octene elastomer; low density polyethylene; antiblocking agent; and antioxidant.

In an example 1.6, the multilayer face stock comprises in the following order:
- a printable first skin layer consisting of: propylene homopolymer(s); Z—N catalysed linear low density polyethylene; antioxidant; and antiblocking agent;
- a core layer consisting of: propylene homopolymer; a modifier consisting of at least one of the following: ethylene-butene elastomer, ethylene-octene elastomer, and ethylene-octene block copolymer; low density polyethylene; and an antioxidant;
- an adhesive receiving second skin layer consisting of propylene homopolymer; linear low density polyethylene; a modifier consisting of at least one of the following: ethylene-butene elastomer, ethylene-octene elastomer, and ethylene-octene block copolymer; low density polyethylene; antiblocking agent; and antioxidant.

Specific amounts and details of the components are presented in the description disclosing separate layers in detail.

Examples 2.1-2.8

In an example 2.1, the multilayer face stock comprises the following layers:
- a printable first skin layer consisting mainly of linear low density polyethylene LLDPE comprising both metallocene catalysed LLDPE and Z—N catalysed LLDPE, and further comprising minor amount of additives, such as antioxidant and antiblocking agent;
- a core layer comprising or consisting of propylene homopolymer; a modifier consisting of at least one of the following: olefin elastomer, olefin plastomer and olefin block copolymer; and low density polyethylene;
- an adhesive receiving second skin layer comprising or consisting of: propylene homopolymer(s); linear low density polyethylene; a modifier consisting of at least one of the following: olefin elastomer, olefin plastomer and olefin block copolymer; low density polyethylene; antiblocking agent; and antioxidant.

In an example 2.2, the multilayer face stock comprises the following layers:
- a printable first skin layer consisting mainly of metallocene catalysed linear low density polyethylene, and further comprising minor amount of additives, such as antioxidant and antiblocking agent;

a core layer comprising or consisting of propylene homopolymer; a modifier consisting of at least one of the following: olefin elastomer, olefin plastomer and olefin block copolymer; low density polyethylene;

an adhesive receiving second skin layer comprising or consisting of: propylene homopolymer(s); linear low density polyethylene; a modifier consisting of at least one of the following: olefin elastomer, olefin plastomer and olefin block copolymer; low density polyethylene; antiblocking agent; and antioxidant.

In an example 2.3, the multilayer face stock comprises the skin layers as presented in Example 2.1 or 2.2, and the core layer comprises the modifier, which is at least one of the following: ethylene-butene elastomer, ethylene-octene elastomer, propylene based elastomer, butene-1 homopolymer, propylene-ethylene plastomer, propylene-butene plastomer, and ethylene-octene block copolymer.

In an example 2.4, the multilayer face stock comprises the skin layers as presented in Example 2.1 or 2.2, and the core layer further comprises one of the following additives: polypropylene compound comprising Bis(4-propylbenzylidene) propyl sorbitol, polypropylene compound comprising phosphate type nucleating agent, and propylene-ethylene block copolymer.

In an example 2.5, the multilayer face stock comprises the skin layers as presented in Example 2.1 or 2.2, and wherein the core layer comprises the modifier consisting of ethylene-octene elastomer and wherein the core layer further comprises an additive of propylene-ethylene block copolymer.

In an example 2.6, the multilayer face stock comprises in the following order:

a printable first skin layer consisting mainly of linear low density polyethylene LLDPE comprising both metallocene catalysed LLDPE and Z—N catalysed LLDPE, and further comprising minor amount of antioxidant and antiblocking agent;

a core layer consisting of propylene homopolymer; a modifier consisting of ethylene-octene elastomer; an additive of propylene-ethylene block copolymer; low density polyethylene; and antioxidant;

an adhesive receiving second skin layer consisting of propylene homopolymer; linear low density polyethylene; a modifier consisting of ethylene-octene elastomer; low density polyethylene; an additive of propylene-ethylene block copolymer; antiblocking agent; and antioxidant.

In an example 2.7, the multilayer face stock comprises in the following order:

a printable first skin layer consisting mainly of linear low density polyethylene LLDPE comprising both metallocene catalysed LLDPE and Z—N catalysed LLDPE, and further comprising minor amount of antioxidant and antiblocking agent;

a core layer consisting of propylene homopolymer, a modifier consisting of ethylene-octene elastomer, low density polyethylene, and antioxidant;

an adhesive receiving second skin layer consisting of propylene homopolymer, linear low density polyethylene, a modifier consisting of ethylene-octene elastomer; low density polyethylene, antiblocking agent, and antioxidant.

In an example 2.8, the multilayer face stock comprises in the following order:

a printable first skin layer consisting mainly of linear low density polyethylene(s), and further comprising minor amount of additives, such as antioxidant and antiblocking agent;

a core layer comprising or consisting of propylene homopolymer; a modifier consisting of at least one of the following: ethylene-butene elastomer, ethylene-octene elastomer, and ethylene-octene block copolymer; and low density polyethylene;

an adhesive receiving second skin layer comprising or consisting of: propylene homopolymer(s); linear low density polyethylene; a modifier consisting of at least one of the following: olefin elastomer, olefin plastomer and olefin block copolymer; low density polyethylene; antiblocking agent; and antioxidant.

Specific amounts and details of the components are presented in the description disclosing separate layers in detail.

Examples 3.1-3.6

In an example 3.1, the multilayer face stock comprises the following layers:

a printable first skin layer comprising or consisting of: propylene homopolymer(s), metallocene catalysed linear low density polyethylene(s), and minor amount of additives, such as antioxidant and antiblocking agent;

a core layer comprising or consisting of propylene homopolymer; a modifier consisting of at least one of the following: olefin elastomer, olefin plastomer and olefin block copolymer; and low density polyethylene;

an adhesive receiving second skin layer comprising or consisting of: propylene homopolymer(s), linear low density polyethylene, a modifier consisting of at least one of the following: olefin elastomer, olefin plastomer and olefin block copolymer; low density polyethylene; antiblocking agent; and antioxidant.

In an example 3.2, the multilayer face stock comprises the skin layers as presented in Example 3.1, and the core layer comprises the modifier, which is at least one of the following: ethylene-butene elastomer, ethylene-octene elastomer, propylene based elastomer, butene-1 homopolymer, propylene-ethylene plastomer, propylene-butene plastomer, and ethylene-octene block copolymer.

In an example 3.3, the multilayer face stock comprises the skin layers as presented in Example 3.1, and the core layer further comprises one of the following additives: polypropylene compound comprising Bis(4-propylbenzylidene) propyl sorbitol, polypropylene compound comprising phosphate type nucleating agent, and propylene-ethylene block copolymer.

In an example 3.4, the multilayer face stock comprises the skin layers as presented in Example 3.1, wherein the core layer comprises the modifier consisting of ethylene-octene elastomer and wherein the core layer further comprises an additive of propylene-ethylene block copolymer.

In an example 3.5, the multilayer face stock comprises the following layers:

a printable first skin layer comprising or consisting of: propylene homopolymer(s), metallocene catalysed linear low density polyethylene(s), and minor amount of additives, such as antioxidant and antiblocking agent;

a core layer comprising or consisting of propylene homopolymer; a modifier consisting of ethylene-octene elastomer; an additive of propylene-ethylene block copolymer; low density polyethylene; and antioxidant;

an adhesive receiving second skin layer comprising or consisting of: propylene homopolymer(s); linear low density polyethylene; a modifier consisting of ethylene-octene elastomer; an additive of propylene-ethylene block copolymer; low density polyethylene, antioxidant; and antiblocking agent.

In an example 3.6, the multilayer face stock comprises the following layers:
- a printable first skin layer comprising or consisting of: propylene homopolymer(s), metallocene catalysed linear low density polyethylene(s), and minor amount of additives, such as antioxidant and antiblocking agent;
- a core layer comprising or consisting of propylene homopolymer; a modifier consisting of at least one of the following: ethylene-butene elastomer, ethylene-octene elastomer, and ethylene-octene block copolymer; low density polyethylene; and antioxidant;
- an adhesive receiving second skin layer comprising or consisting of: propylene homopolymer(s); linear low density polyethylene; a modifier consisting of at least one of the following: ethylene-butene elastomer, ethylene-octene elastomer, and ethylene-octene block copolymer; low density polyethylene; antioxidant; and antiblocking agent.

Specific amounts and details of the components are presented in the description disclosing separate layers in detail.

Examples 4.1-4.6

In an example 4.1, the multilayer face stock comprises the following layers:
- a first skin layer consisting of: propylene homopolymer(s), metallocene catalysed linear low density polyethylene, and minor amount of antioxidant;
- a core layer comprising or consisting of: propylene homopolymer; a modifier consisting of at least one of the following: olefin elastomer, olefin plastomer and olefin block copolymer; low density polyethylene;
- an adhesive receiving second skin layer comprising or consisting of: propylene homopolymer(s), linear low density polyethylene, a modifier consisting of at least one of the following: olefin elastomer, olefin plastomer and olefin block copolymer; low density polyethylene, antiblocking agent, and antioxidant.

In an example 4.2, the multilayer face stock comprises the following layers:
- a first skin layer consisting of linear low density polyethylenes, and minor amount of antioxidant;
- a core layer comprising or consisting of: propylene homopolymer; a modifier consisting of at least one of the following: olefin elastomer, olefin plastomer and olefin block copolymer; low density polyethylene;
- an adhesive receiving second skin layer comprising or consisting of: propylene homopolymer(s), linear low density polyethylene, a modifier consisting of at least one of the following: olefin elastomer, olefin plastomer and olefin block copolymer; low density polyethylene, antiblocking agent, and antioxidant.

In the first skin layer linear low density polyethylene(s) may consists of metallocene catalysed linear low density polyethylene(s). Alternatively, the linear low density polyethylene(s) may consists of metallocene catalysed and Ziegler-Natta catalysed linear low density polyethylene(s).

In an example 4.3, the multilayer face stock comprises the skin layers as presented in Example 4.1 or 4.2, and the core layer comprises the modifier, which is at least one of the following: ethylene-butene elastomer, ethylene-octene elastomer, propylene based elastomer, butene-1 homopolymer, propylene-ethylene plastomer, propylene-butene plastomer, and ethylene-octene block copolymer.

In an example 4.4, the multilayer face stock comprises the skin layers as presented in Example 4.1 or 4.2, and the core layer further comprises one of the following additives: polypropylene compound comprising Bis(4-propylbenzylidene) propyl sorbitol, polypropylene compound comprising phosphate type nucleating agent, and propylene-ethylene block copolymer.

In an example 4.5, the multilayer face stock comprises the skin layers as presented in Example 4.1 or 4.2, and wherein the core layer comprises the modifier consisting of ethylene-octene elastomer and wherein the core layer further comprises an additive of propylene-ethylene block copolymer.

In an example 4.6, the multilayer face stock comprises the skin layers as presented in Example 4.1 or 4.2, and wherein the core layer comprises the modifier consisting of at least one of the following: ethylene-butene elastomer, ethylene-octene elastomer, and ethylene-octene block copolymer. Specific amounts and details of the components are presented in the previous description disclosing separate layers in detail.

Properties of a Facestock

At least some/all embodiments have sufficient mechanical properties of the face stock, such as modulus and stiffness, providing efficient processing of labels in usual labelling devices and lines. At least some/all embodiments provide 1% secant modulus between 1800 and 2800 MPa and L&W bending resistance (5 mm, 15°) between 20 and 40 mN in machine direction providing easy die-cuttability of the label laminate web into individual labels.

At least some/all embodiments have suitable properties, such as conformability, enabling clean labelling of contoured items without wrinkles.

At least some/all embodiments have elongation at break in cross direction between 600 and 900% providing conformability for the adhesive labels.

At least some/all embodiments have internal haze lower than 10%, for example between 1 and 9% providing clear and transparent labels enabling no-label look and visibility through the label.

At least some/all embodiments have enhanced adhesion between the core and skin layer(s) thus preventing peeling (delamination) of the multilayer facestock.

At least some/all embodiments have also enhanced ink anchorage to the first skin layer.

Properties for uniaxially in MD oriented multilayer face stocks were measured. At least three parallel samples were tested. 1% secant modulus values were defined according to ISO 527-3 standard, wherein the measured tension values are multiplied by 100 for reporting the 1% secant modulus results. For example, 1% secant modulus value of 2000 MPa tension corresponds to 20 MPa actual tension value. Sample width used in tests was 15 mm. Bending resistance (5 mm, 15°) for samples were determined by using Lorentzen&Wettre (L&W) bending tester. The force needed to bend a test piece comprising bending length of 5 mm to a predetermined bending angle of 15° was measured. Adjusted L&W bending resistance refers to bending resistance adjusted for 50 µm sample thickness.

In an example, uniaxially in MD oriented multilayer facestock samples according to Example 1.5 and comprising stretch ratio between 7 and 7.5 in MD have 1% secant modulus in machine direction of the facestock between 2100 and 2600 MPa.

In an example, uniaxially in MD oriented multilayer facestock samples according to Example 2.7 and comprising stretch ratio between 6.5 and 7.5 in MD have 1% secant modulus in machine direction of the facestock between 1800 and 2400 MPa.

In an example, multilayer facestock samples according to Example 1.5 and comprising stretch ratio between 7 and 7.5 have adjusted bending resistance (5 mm, 15°) between 30 and 35 mN in machine direction of the face stock.

In an example, multilayer facestock samples according to Example 2.7 and comprising stretch ratio between 6.5 and 7.5 have adjusted bending resistance (5 mm, 15°) between 20 and 30 mN in machine direction of the face stock.

In an example, multilayer facestock samples according to Example 1.5 and comprising stretch ratio between 7 and 7.5 have elongation at break between 740 and 870% in cross direction of the face stock.

In an example, multilayer facestock samples according to Example 2.7 and comprising stretch ratio between 6.5 and 7.5 have elongation at break between 790 and 820% in cross direction of the face stock.

According to at least some/all embodiments an internal haze (D65/100) of the multilayer facestock may be lower than 10%, or lower than 8%, for example, between 1 and 6% or between 4 and 5%. Internal haze refers to the haze of the facestock after removing the surface roughness, for example, by wetting out the both surfaces of the facestock. Wetting may be provided by top-coating and applying an adhesive layer. The haze is tested according to standard ASTM D1003.

In an example multilayer facestock samples according to Example 1.5 and comprising stretch ratio between 7 and 7.5 have internal haze between 8.5 and 9.5%. In an example, multilayer facestock samples according to Example 2.7 and comprising stretch ratio between 6.5 and 7.5 have internal haze between 5 and 9%.

Alternatively, multilayer facestock may be opaque or white. Therefore, the facestock may comprise one or more pigment and/or inorganic filler as an additive to provide the facestock with a desired colour. Additives may include, for example, titanium dioxide, calcium carbonate and blends thereof. Carbon black may be introduced to provide a black or grey facestock. Opaque facestocks may have an opacity of at least 70%, at least 75%, or at least 80%, for example between 70 and 95%, between 70 and 90%, between 70 and 85%, or between 70 and 80%. In a multilayer facestock structure the pigment may be included in only one layer. The pigment may be included, for example, in the core layer. Alternatively, the pigment may be also in other layers. If the face comprises pigment the amount of main polymer(s) of the face layer is reduced in proportion. For example, the face layer including 20 wt. % pigment filler comprises 20% reduced total amount of main polymer(s) when compared to clear face layer without the pigment. In an example, an amount of the propylene homopolymer is reduced in the core layer comprising pigment.

Layer-to-layer adhesion also referred to as interlayer adhesion may be tested as follows: one side of a multilayer facestock sample having width of approximately 50 mm is firmly attached on a glass plate with a 2-sided adhesive tape. Delamination of the facestock attached on a glass plate is then tested with different tapes having different adherence. The adhesive tape is pulled from the sample to test whether sample delaminates or not. Tapes used for the test are as follows: TESA 4204, clear 18 mm; TESA 4104, red 25 mm; and silicone tape 50 mm. Adherence of the adhesive tapes increases respectively. In other words, silicone tape has greatest adherence. Based on the visual appearance and delamination observed the layer-to layer adhesion is either "OK" or "Not OK".

When testing layer-to-layer adhesion of the multilayer facestock including the first skin layer comprising propylene homopolymer and metallocene catalysed LLDPE or alternatively the first skin layer consisting mainly of metallocene catalysed linear low density polyethylene(s) no delamination was detected i.e. observed layer-to layer adhesion results were "OK" for all tested tape types.

Manufacturing

A method for manufacturing an adhesive label laminate and labels thereof according to embodiments of the invention comprises forming a non-oriented multilayer face stock by melt processing technique, such as co-extrusion process. Stretching the continuous non-oriented face stock in a machine direction with a specific stretch ratio so as to provide a machine direction oriented multilayer face stock. Laminating the machine direction oriented face stock with a release liner for forming a label laminate. An adhesive layer is applied onto a surface of the face stock and/or onto a surface of the release liner prior to lamination step.

Stretching may be provided by means of a machine direction orienter via rolls with increasing speed. The stretching occurs due to a difference in speed between the last and the first rolls. In a stretching process the rolls are heated sufficiently to bring the substrate to a suitable temperature, which is normally below the melting temperature ($T_m$), or around the glass transition temperature ($T_g$) of the polymer.

According to an example, the method for manufacturing a machine direction oriented face stock further comprises cooling of the oriented face stock to an ambient temperature after the stretching for forming a non-annealed face stock. Cooling of the machine direction oriented face stock is performed right after the stretching i.e. cooling step directly follows the stretching in order to provide a non-annealed face stock.

According to an example, the method for manufacturing a machine direction oriented face comprises an annealing of the face stock after the stretching step for forming an annealed face stock. After annealing a cooling of the annealed face stock to an ambient temperature is provided.

Annealing may be performed in an annealing section, which allows stress relaxation of the oriented face stock by keeping the face stock at an elevated temperature for a certain period of time. After annealing cooling of the face stock to an ambient temperature is provided. The face stock may be called as annealed or alternatively as heat-set face stock.

The invention claimed is:

1. An adhesive label comprising an uniaxially oriented multilayer facestock, wherein the facestock is uniaxially oriented in machine direction and comprises a core layer, a printable skin layer adjoined to the core layer, an adhesive receiving skin layer adjoined to the core layer opposite the printable skin layer, wherein the adhesive receiving skin layer is coated with an adhesive layer for adhering the adhesive label to the surface of an item to be labelled, and wherein the core layer consists of:
    40 to 87 wt. %. of a propylene homopolymer;
    5 to 20 wt. %. of a modifier consisting of at least one of the following: ethylene-butene elastomer, ethylene-octene elastomer, and ethylene-octene block copolymer;
    low density polyethylene; and
    an antioxidant;

wherein the printable skin layer consists of
40 to 70 weight percent propylene homopolymer(s);
25 to 59.5 weight percent Ziegler-Natta catalysed linear low density polyethylene having a density of between 0.930 and 0.940 g/cm$^3$, when measured according to standard ASTM D 792; and
at least one of:
- 0.5 to 2 weight percent of an antiblocking composition comprising an antiblocking agent and a carrier, wherein the antiblocking composition comprises 0.05 to 0.2 weight percent of the antiblocking agent; and
- 0.5 to 3 weight percent of an antioxidant composition comprising an antioxidant and a carrier, wherein the antioxidant composition comprises 0.1 to 0.6 weight percent of an antioxidant;

wherein the facestock exhibits a haze of less than 10%.

2. An adhesive label according to claim 1, wherein the Ziegler-Natta catalysed linear low density polyethylene exhibits a molecular weight distribution $M_w/M_n$ between 3 and 4.

3. An adhesive label according to claim 1, wherein the total amount of the modifier is between 10 and 15 wt. %.

4. An adhesive label according to claim 1, wherein the amount of propylene homopolymer in the core layer is between 75 and 87 wt. %.

5. An adhesive label according to claim 1, wherein the amount of low density polyethylene in the core layer is between 1 and 10 wt. %.

6. An adhesive label according to claim 1, wherein the adhesive receiving skin layer comprises propylene homopolymer; linear low density polyethylene; a modifier consisting of at least one of the following: olefin elastomer, olefin plastomer and olefin block copolymer; and low density polyethylene.

7. An adhesive label according to claim 1, wherein the facestock layer is uniaxially oriented in machine direction having stretch ratio between 3 and 9.

8. An adhesive label according to claim 1, wherein the adhesive layer adjacent to the adhesive receiving skin layer comprises a pressure sensitive adhesive.

9. A combination of an adhesive label and an article, wherein the adhesive label according to claim 1 is adhered through the adhesive layer to the surface of the article.

10. An adhesive label laminate comprising the adhesive label according to claim 1, wherein the adhesive layer comprises a pressure sensitive adhesive, and the adhesive label laminate further comprises a release liner adjacent to the adhesive layer.

* * * * *